United States Patent
Xiang et al.

(10) Patent No.: US 8,955,320 B2
(45) Date of Patent: Feb. 17, 2015

(54) METHODS AND APPARATUS FOR LATENT HEAT (PHASE CHANGE) THERMAL STORAGE AND ASSOCIATED HEAT TRANSFER AND EXCHANGE

(75) Inventors: Xiaodong Xiang, Danville, CA (US); Rong Zhang, Cupertino, CA (US)

(73) Assignee: BlueLagoon Technologies Ltd., Saratoga, CA (US)

( * ) Notice: Subject to any disclaimer, the term of this patent is extended or adjusted under 35 U.S.C. 154(b) by 231 days.

(21) Appl. No.: 13/405,085

(22) Filed: Feb. 24, 2012

(65) Prior Publication Data

US 2012/0241122 A1    Sep. 27, 2012

Related U.S. Application Data

(60) Provisional application No. 61/446,335, filed on Feb. 24, 2011, provisional application No. 61/533,626, filed on Sep. 12, 2011, provisional application No. 61/570,520, filed on Dec. 14, 2011.

(51) Int. Cl.
*F01K 1/00*    (2006.01)
*F28D 17/00*    (2006.01)
(Continued)

(52) U.S. Cl.
CPC .............. *C09K 5/04* (2013.01); *F28D 20/0034* (2013.01); *F03G 6/065* (2013.01);
(Continued)

(58) Field of Classification Search
CPC ........... F01K 3/00; F01K 27/00; F03G 6/003; F03G 6/065; F03G 7/065; F28D 20/0034; F28D 20/0056; F01D 17/00; F01D 17/085

USPC ............................ 60/527–529, 659, 653, 676, 60/641.8–641.15; 165/10, 104.13–104.21
See application file for complete search history.

(56) References Cited

U.S. PATENT DOCUMENTS 4,355,627 A    10/1982  Scarlata
6,957,536 B2 *  10/2005  Litwin et al. ................. 60/641.8
(Continued)

FOREIGN PATENT DOCUMENTS

JP    2004-150773    5/2004
KR    10-2000-0010920    2/2000
WO    WO/2012/148551    11/2012

OTHER PUBLICATIONS

PCT International Search Report and Written Opinion dated Nov. 16, 2012 issued in PCT /US2012/026594.
(Continued)

*Primary Examiner* — Hoang Nguyen
(74) *Attorney, Agent, or Firm* — Weaver Austin Villeneuve & Sampson LLP

(57) ABSTRACT

In various embodiments, phase change and heat exchange methods between heat collection, heat transfer, heat exchange, heat storage, and heat utility systems are described. In certain embodiments, the heat transfer fluids/heat exchange fluids, heat storage media, and working media in the system are all phase change materials with transition temperatures close to each other and in decreasing order and perform their respective function through phase changes within a relatively narrow temperature range. Methods to control heat transfer rate, heat exchange and/or heat charging/discharging rate between heat collection, thermal energy storage and heat utility apparatus at will are provided. Methods of controlling such systems are also provided.

30 Claims, 7 Drawing Sheets

(51) Int. Cl.
*F28D 19/00* (2006.01)
*C09K 5/04* (2006.01)
*F28D 20/00* (2006.01)
*F03G 6/06* (2006.01)
*F03G 6/00* (2006.01)
*F01K 3/00* (2006.01)
*C09K 5/06* (2006.01)
*F28D 20/02* (2006.01)

(52) U.S. Cl.
CPC ........... *F28D 20/0056* (2013.01); *F03G 6/003* (2013.01); *F01K 3/00* (2013.01); *C09K 5/063* (2013.01); *F28D 20/021* (2013.01); *F28D 20/025* (2013.01); *Y02E 60/145* (2013.01); *F28D 2020/0047* (2013.01)
USPC ................ 60/641.8; 60/653; 60/659; 60/676; 165/10

(56) References Cited

U.S. PATENT DOCUMENTS

| | | | |
|---|---|---|---|
| 7,191,597 B2* | 3/2007 | Goldman | 60/641.8 |
| 7,296,410 B2* | 11/2007 | Litwin | 60/641.12 |
| 7,640,746 B2* | 1/2010 | Skowronski et al. | 60/641.8 |
| 7,877,999 B2* | 2/2011 | Nuel et al. | 60/641.13 |
| 7,954,321 B2* | 6/2011 | Shinnar | 60/641.8 |
| 8,464,535 B2* | 6/2013 | White et al. | 60/659 |
| 2009/0250189 A1 | 10/2009 | Soukhojak et al. | |

OTHER PUBLICATIONS

PCT International Preliminary Report on Patentability dated Aug. 27, 2013 issued in PCT /US2012/026594.

* cited by examiner

METHODS AND APPARATUS FOR LATENT HEAT (PHASE CHANGE) THERMAL STORAGE AND ASSOCIATED HEAT TRANSFER AND EXCHANGE

CROSS-REFERENCE TO RELATED APPLICATIONS

This application claims benefit of and priority to U.S. Ser. No. 61/446,335, filed on Feb. 24, 2011, to U.S. Ser. No. 61/533,626, filed on Sep. 12, 2011, and to 61/570,520, filled Dec. 14, 2011, all of which are incorporated herein by reference in their entirety for all purposes.

STATEMENT OF GOVERNMENTAL SUPPORT

[Not Applicable]

BACKGROUND

Energy storage is important in many energy consumption applications. Such applications include conventional and renewable utility power generation, air-conditioning and heating of buildings, industrial process heating, and the like. Energy storage permits nuclear and coal-fired power plants to shift power generated during low demand hours to peak demand hours. Energy storage to meet grid demand is even more important for wind and solar power plants since the power output of these energy resources varies with time of day, and weather conditions.

Direct electric energy storage typically utilizes batteries. Although there are continuing efforts to improve battery technologies, the intrinsic high cost of batteries limits their application to small scale emergency power supplies. Hydroelectric and compressed air storage systems are two current solutions where electricity is first converted to potential energy of water or air by pumps and compressors, and then converted back to electricity when needed. However, these solutions typically require special terrain and/or geological conditions, i.e. terrain permitting the building of low and high attitude water reservoirs, and/or natural underground air-tight high pressure air-reservoirs. Such conditions are rarely available for exploitation by local power plants.

Thermal energy storage is intrinsically low cost, due to the availability of various low cost materials for this use. Since most power plants (more than 80%) generate electricity through thermal processes, thermal energy storage can be conveniently applied to utility power generation.

Thermal energy storage is also important for concentrated solar power (CSP) plants. The working principle of CSP is to use focusing mirrors (e.g., parabolic dish mirrors, parabolic trough mirrors, Fresnel mirrors, and other types of focusing mirrors) to focus the solar radiation on a thermal collector, where special coating(s) convert the light into thermal energy. The thermal energy heats up a heat transfer fluid (HTF) flowing through the thermal collector to a certain hot temperature. The hot heat transfer fluid is then used to generate high pressure high temperature steam via heat exchanger(s) to drive steam turbine(s) for electricity generation. CSP power systems thus typically replace fossil fuel or nuclear fuel boilers with a solar heater/boiler, while keeping the other portions of the conventional power plant essentially unchanged.

However, because of variations in the "availability" of solar radiation, caused by clouds, inclement weather, the day/night cycle, and the like, a thermal storage sub-system is desirable in CSP plants in order provide a more constant source of power and to qualify them as a base load power supplier. Accordingly, a low cost and highly efficient thermal storage solution is important for CSP plants to be deployed in large scale to replace fossil fuel power plants. For example, for a given parabolic trough CSP power plant, without a thermal storage sub-system, the annual operation coefficient (percentage of time the CSP generates power) will be about 20%, i.e., approximately 1760 operating hours per year. However, if a thermal storage sub-system is used in conjunction with the CSP, the operating coefficient can be increased to more than 60% or approximately 5260 operating hours per year.

In typical thermal storage applications, there are three key thermal media: a heat transfer fluid (HTF), a thermal storage medium, and a working medium. Heat transfer fluids (HTF's) transfer the heat from a heat generator or collector to thermally charge a thermal storage medium, or to directly heat a working medium through for example, a heat exchanger. In certain implementations, a thermal storage medium charges (stores heat) by receiving the heat from a heat transfer fluid (HTF) and then later discharges the heat back to a heat transfer fluid (e.g., during hours of low insolation) that then delivers the heat to a working medium through a heat exchanger. The working medium receives the heat from the heat exchanger and drives the heat engine.

Heat transfer fluids are typically either a gas or a liquid. There two types of liquid HTF in common use. One is heat conducting oil and the other is molten salt. Normally, the highest temperature heat conducting oil can sustain is about 400° C. Above this temperature heat conducting oils typically decompose. Molten salt, on the other hand, can sustain a temperature up to about 600° C. However, molten salts typically must be continuously kept at a temperature higher than about 220° C. in order to avoid solidification and subsequent damage to transport pipes and containers. This high temperature requirement normally results in higher system maintenance costs. For gas type HTFs, steam can be used, however, however, high temperature steam is costly and requires high pressures. In certain implementations, hot air can be used, but hot air has a very low heat capacity and to conduct the same amount of heat per unit time a very high flow velocity is required. Considerable power is consumed to maintain this high flow velocity which substantially reduces the overall efficiency of systems that use hot air as a heat transfer fluid (HTF)>

In many systems, the working medium is a liquid, such as water, which is pre-pressurized to a desired working pressure, and heated to the desired working temperature via a heat exchanger, and finally released under pressure to undergo a liquid to gas phase transition. High pressure vapor is typically further over heated to eliminate water droplets before reaching the entrance to a heat engine, and is expanded at the entrance of the heat engine. During this process, the potential energy of pressurized molecules transforms to kinetic energy due to the expansion. This kinetic energy provides the driving force of the heat engine to produce mechanical work and, finally, to generate electricity. Such systems typically require high temperature, high pressure working media. For example, a typical 1 MW steam turbine requires ~2.4 MPa pressure at a temperature of about 355° C. to achieve the greatest efficiency. For a typical 100 MW steam turbine, the required steam pressure and temperature increases to about 10 to 12 MPa at a temperature of about 380° C. to 400° C. Large size steam turbines can usually achieve higher conversion efficiencies of thermal energy to electricity, but in order to achieve this, they also require steam at a higher pressure and temperature.

Two approaches to store thermal energy based on the types of heat absorbed in materials include methods that exploit the storage of sensible heat and methods that exploit the storage of latent heat.

Sensible heat storage mechanisms may be based on the specific heat capacity of the storage medium, where the charging and discharging of thermal energy to and from the storage medium can be realized by increasing or decreasing the temperature of the materials as illustrated by the formula: $Q=MC_P(T_2-T_1)=MC_P\Delta T$ (Eq. 1), where Q is the sensible heat stored in the heat storage medium, M is the mass of the heat storage medium, C is the specific heat capacity of the heat storage medium, $T_1$ and $T_2$ are the starting and ending temperatures, respectively, and $\Delta T$ is the temperature difference. Sensible heat storage is the most common, simple, mature and widely used thermal storage method. It can be further classified into four different methods: 1) liquid phase, 2) solid phase, 3) liquid and solid mixed phase, and 4) pressurized vapor sensible heat storage.

Liquid phase sensible heat thermal storage devices normally use either direct or indirect heat exchange methods. For example, a CSP solar collecting field, such as a parabolic trough or linear Fresnel mirror system, normally uses a conducting oil (mineral oil or synthetic oil) as its HTF in conjunction with molten salt as a liquid phase sensible heat thermal storage material. Such liquid-phase sensible storage materials are most often used in so called "Active Thermal Energy Storage" systems, where storage materials circulate through heat exchangers and collectors. In such systems a heat exchanger is typically used to transfer thermal energy from conducting oil to molten salt to store the thermal energy. Therefore, this method is called indirect thermal storage. Currently, most distributed solar thermal collecting fields (such as parabolic dish, parabolic trough, and linear Fresnel CSP) use such methods, which are presently one of the only two commercialized mature thermal energy storage methods.

The other commercialized thermal energy storage method is so called direct thermal storage. Systems that provide direct thermal storage with sensible heat typically utilize two tanks, one for high temperature molten salt and the other one for low temperature molten salt. During thermal energy storage (charging), high temperature conducting oil (HTF) transfers heat via a heat exchanger to the low temperature molten salt which flows or is pumped from the low temperature container to the high temperature container. The resulting high temperature molten salt is then stored in the high temperature container. When solar energy is not available, the storage system discharges to provide heat for electricity generation. When discharging heat, the high temperature salt flows or is pumped through a heat exchanger to the low temperature container. The heat exchanger transfers heat to generate high temperature high pressure steam for electricity generation. This discharge process comes to an end when most of the high temperature molten salt flows out from the high temperature container.

There are several problems with this approach: First, it requires several high temperature specialty pumps that can pump high temperature and very corrosive molten salt between the two containers, the conducting oil-molten salt heat exchanger, and the molten salt-steam generation heat exchanger. Second, it requires a specialized heat exchanger due to the corrosive nature of molten salt. Finally, the construction cost is still quite high: for example, for large scale deployment, the construction cost of such storage devices can be approximately $40/kWh of heat.

In certain implementations, a molten salt two container storage systems can also be configured as a direct thermal energy storage sub-system for a CSP system. Typically, in such implementations, the molten salt acts both as HTF for the solar collecting field and as a liquid phase sensible heat thermal storage material, i.e., HTF and sensible heat thermal storage material become the same material. Because no extra heat exchanger is involved, this approach is sometimes called direct thermal energy storage. This approach avoids a heat exchanger, which reduces thermal energy loss during the process. It is suitable for parabolic trough systems and works at approximately the 400° C.-500° C. temperature range. The main shortcoming with this approach is that extra heating devices and energy are typically required to keep the molten salt temperature above 220° (which is common molten salt's melting point), in order to avoid damage to the transport piping system. For a distributed solar collecting field, this significantly increases the complexity, the cost for the transport pipe(s), both in their construction and in their maintenance and services, and reduces the overall efficiency of the system.

Tower CSP systems can use direct liquid phase sensible heat thermal energy storage systems. One example is the Solar Tres tower CSP power plant in Spain. Because the transport piping system is vertically installed in the CSP tower, the liquid molten salt is easily discharged from the pipes so that the solidification problem is not as severe as in the parabolic trough CSP system. In addition, since the working temperature of tower CSP systems is normally significantly higher than that of parabolic trough CSP systems, the sensible heat thermal storage approach is more suitable to the tower CSP than for the trough CSP. For typical liquid phase temperature ranges in such systems, a mixture of inorganic salts or a single phase compound is used. For example, the Solar Two tower CSP in Nevada (United States) used 60% sodium nitride and 40% potassium nitride as a single phase compound. The melting point of this mixture is 220° and the working range is approximately 300° C.-600°. The SEGS trough system built in California desert the 1990s used therminol VP-1, Hitech (a 53% $KNO_3$+7% $NaNO_3$+40% $NaNO_2$ mixture) and Hitec XL (a 45% $KNO_3$+48% $Ca(NO_3)_2$+7% $NaNO_3$ mixture) as direct liquid sensible heat thermal energy storage materials.

Solid state sensible heat thermal energy storage uses low cost materials such as rock, concrete, sand, and the like as thermal storage media. Since the solid materials cannot be transported between containers for thermal energy transportation, a gas phase or liquid phase HTF is also used for heat exchange media between the storage medium and working medium. This type of system is also called a "Passive Thermal Energy Storage" system. In direct steam generation CSP systems, the thermal storage system normally uses solid state sensible heat thermal energy storage materials. The greatest advantage is the low cost for such thermal storage materials. However, such systems are only used in indirect thermal energy storage approaches.

Tamme from Germany Aero Space Center (DLR) studied and developed high temperature concrete and cast ceramic as solid state sensible heat thermal energy storage materials based on a study of sand-rock concrete and basalt concrete properties, where the frame for the high temperature concrete is ferric oxide, and the cement acts as filling material. A disadvantage of solid state sensible storage methods is that the heat exchange and working temperature decreases during discharge, since the temperature of the sensible heat storage materials decreases as thermal energy (content) decreases. Another problem of such systems is that the thermal conductivity and heat transfer efficiency is low. Also if direct generated steam is used for the HTF, as it currently is, this requires the transport piping systems to cross the entire solar collecting field and the thermal storage containers must be constructed to sustain high temperatures and high pressures. This dramatically increases the cost for such steam transport as well as the thermal storage container cost. On the other hand, to reduce such costs, the pressure of the directly generated steam can be lowered. However this decreases the working efficiency of the turbine(s) driven by this steam. As consequence, this approach has been researched for a long time without major breakthroughs.

Liquid-solid state combined sensible heat thermal energy storage approaches use solid state storage materials and heat transfer fluids (HTFs) that are compatible at high temperature so that the solid state material and the HTF can be combined together to increase the heat capacity for the combined thermal storage system. One advantage of using solid state materials in thermal storage is to significantly reduce the usage of HTF while keeping the total amount of thermal storage unchanged so that the thermal storage cost can be lowed (in general, solid state material costs are much lower than that of the HTF). In order to reduce the equipment investment cost for the two tank liquid phase molten salt thermal energy storage system, thermocline tank storage systems have been tested (e.g., 2.3 MWh system at Sandia National Laboratory). The thermocline tank storage system utilizes a thermocline layer formed due to natural temperature cline distribution based on the relationship between thermal storage material density and the temperature.

A thermocline layer is formed when there is a temperature difference between the top (high temperature portion) of the thermal storage tank and the bottom (the low temperature portion) of the thermal storage tank. The thermocline layer acts as an insulation layer so that the molten salt on the top can be kept at a higher temperature and the molten salt on the bottom can kept at a lower temperature. During a thermal charging (thermal storage) period, the thermocline layer moves in an upward direction. During a thermal energy release (discharge) period, the thermocline layer moves downwards. In this way, the output molten salt is kept at a constant temperature. However, when the thermocline layer reaches the top of the tank or reaches the bottom of the tank, the temperature of the molten salt changes dramatically. In order to maintain the temperature layer gradient, one needs to strictly control the input and output of molten salt, as well as to properly arrange the solid state filling material into a layered structure, paired with floating inlet and ring-shell heat exchanger devices. Although this approach may reduce the thermal storage cost by 35% as compared to the previously described liquid phase sensible heat thermal energy storage system, it still has similar shortcomings to those mentioned above.

The CSP power plant of Planta Solar 10 (PS10) at Seville Spain uses pressurized steam at 285° C. with 4 MPa pressure to store the thermal energy. PS10 uses a high pressure container to store the pressured high temperature water flowing directly from a heat source or collector through high pressure pipes. This thermal storage approach smoothes the solar radiation intensity fluctuations during the day and can provide one hour of steam to the turbine power generator. When the pressurized high temperature water is released from the storage vassal, it undergoes a liquid-gas phase transition as the pressure is slightly reduced. The resulting high pressure steam can be used directly to drive a steam turbine. Strictly speaking, the stored energy here is still provided as sensible heat from high pressure water, not latent heat which only exists upon liquid-gas phase transition outside the storage tank. This is an effective method to provide a balanced load for a steam turbine. However, due to the high cost of pressurized vessels, this approach is very difficult to deploy at a large scale.

A working medium typically absorbs most energy near the working temperature, i.e. the temperature at the entry of the heat engine. This is due to large latent heat absorbed at the liquid to gas phase transition or to the large heat capacity of the medium near its critical point the liquid turns into gas phase regardless of the pressure. As a consequence, a sensible heat storage medium has to provide all needed thermal energy at this temperature. In order to do this, sensible heat storage media need to be charged to a much higher temperature according to the Eq. 1 (above). This relationship can also be expressed by following equation:

$$Q = M_w L_{wphase}(@T_{phase}) = M_{HTF} C_{P\text{-}HTF} \Delta T \qquad \text{(Eq. 1B)}$$

where $M_w$ and $L_{wphase}$ are the working medium flow mass and the phase change latent heat. According to Eq.1B, the thermal energy required for working medium at its phase change temperature ($T_{phase}$) is about a few hundred times higher than the heat capacity per degree of the sensible heat storage materials ($C_{wphase} > 100 C_{P\text{-}HTF}$). The product of $\Delta T$ and the mass M (proportional to the flow rate) has to be on the order of hundreds in order to provide enough thermal energy to produce the phase change. This approach requires vast quantities of heat transfer fluid (HTF) and a high volume of HTF circulation which also consumes energy. This requirement presents many challenges to the sensible thermal storage systems. Such challenges include: 1) Heat loss in transfer pipes and storage container, as well as in collector if the heat is from solar energy will be very high due to thermal radiation and convention, and difficult to control to an acceptable level. 2) It requires the HTF also work at this higher temperature. Usually the acceptable working temperature of HTF limits the temperature $T_2$ and in turn limits the phase change temperature of the working medium. A lower phase change temperature of the working medium will result a lower efficiency of the heat engine.

To match the large thermal energy demand near the working temperature of the working medium, a phase change material that has a transition temperature at the working temperature can be used as the thermal storage medium where the large latent heat absorbed or released at the phase transition matches the demand. Furthermore, to provide a storage medium that can store such large amount of heat, the HTF can also to be a phase change material, otherwise a very large flow rate (100 times larger than the flow rate of working medium) typically must be adopted for the HTF, or a very high working temperature is required for the HTF.

Latent heat storage mechanisms utilize the heat associate with a material's physical state change, such as liquid to gas, solid to liquid, solid crystalline phase to phase transition. Latent heat associated with the transition has much higher effective specific heat capacity within transition the phase transition than that of sensible heat storage materials.

Heat absorbed or released at the phase transition is described by: Q=MCp(eff) δT=MLPCM (Eq. 2), where M is the mass of the materials, Cp(eff) is the effective heat capacity within phase transition, δT is the temperature difference within the transition range, and LPCM is the latent heat of PCM at the transition. Latent heat storage matching the heat demand of a working medium near its working temperature, lowers the required working temperature of the HTF and heat collectors, and therefore heat loss; and improves the efficiency of the heat engine. However, liquid-gas phase change latent heat storage is difficult to use due to the extremely large volume change that accompanies the phase change. Water, for instance, expands 1600 times when it vaporizes at 0.1 MPa pressure (one atmosphere). Therefore, it has not proven economical to utilize latent heat for thermal energy storage with a liquid-gas phase transition, because a large container with very high pressure inside the storage container was thought to be required to accommodate the gas phase volume, resulting significantly reduced thermal energy storage density and difficult mechanical structure design for the thermal storage apparatus.

In Europe, thirteen countries proposed a design of PCM storage system, referred to as the DISTOR project. In this project, direct generated steam or (high pressure water) is used as HTF, and graphite and PCM micro-encapsulated compound storage materials are used. Other methods involve mixed PCMs have also been proposed. In such previous proposals, heat exchange between HTF/WF and storage materials utilize a shell-piping heat exchanger, where HTF/WF flow in piping and PCMs surround piping inside the tank with solid filling materials to improve the thermal contact.

Although there are many studies on PCM thermal storage, there are still major difficulties involved with using solid-liquid phase change materials (PCM) as latent heat storage media. One is that PCM volume changes during phase transition. The volume change makes mechanical system design considerably difficult. Another difficulty is the maintenance of good heat conduction between solid-liquid PCMs and HTF. Heat transfer between the storage medium, HTS and working medium has not been solved properly, as the result, no commercial application of latent heat storage methods and apparatus have succeeded to date.

SUMMARY

In various embodiments, methods and apparatus (systems) are provided for phase change heat exchange and heat storage between heat collection, heat transfer, heat exchange, heat storage, and heat utility systems. In certain embodiments the heat transfer fluids/heat exchange fluids, heat storage medium and working medium in the system are all phase change materials with transition temperatures close to each other and in decreasing order (e.g., HTF>thermal storage medium>working fluid) and perform their respective function through phase changes within a relatively narrow temperature range, The methods to control heat transfer rate, heat exchange and/or heat charging/discharge rate between heat collection, thermal energy storage and heat utility apparatus at will are provided. More particular methods of controlling such systems through computer-implemented embodiments of such methods are provided.

In certain embodiments a phase change material heat storage system (latent heat thermal storage system) is provided. In various embodiments the system comprises a thermal storage chamber containing a phase change thermal storage material; a heat input device that carries a heat transfer fluid from a heat source, where the heat input device is configured to inject a vapor form of the heat transfer fluid into the thermal storage chamber; and a heat output device that carries a working medium from the thermal storage chamber to the device or system that is to be operated by the working medium, and that provides one or more heat exchange surfaces to transfer heat from the thermal storage chamber into the working medium; where the heat transfer fluid is a liquid-gas phase change material with a phase transition temperature close to and above-the phase transition temperature of the thermal storage material and/or the working fluid. In certain embodiments the phase change thermal storage material is a liquid-solid thermal storage material. In certain embodiments the phase change thermal storage material is contained within one or more phase change material canisters located in the thermal storage chamber. In certain embodiments the phase change thermal storage materials comprises a material selected from the group consisting of a paraffin, a fatty acid, a polyethylene glycol, and a salt. In certain embodiments the phase change thermal storage material comprise an anhydrous salt. In certain embodiments the phase change thermal storage material comprises one or more materials in Table 3 and/or Table 4. In certain embodiments the heat transfer fluid acts as the working medium in the heat output device. In certain embodiments the heat output device comprises a heat exchanger that transfers heat from the heat transfer fluid to the working medium. In certain embodiments the heat transfer fluid comprises a material selected from the group consisting of an oil, and an organic solvent. In certain embodiments the heat transfer fluid comprises a material found in Table 2. In certain embodiments the working fluid comprise water or an ammonia solution. In certain embodiments the thermal storage material comprises $NaNO_3$. In certain embodiments the heat transfer fluid comprises an oil (e.g., a VP-1 oil).

In certain operating configurations, the heat output device is configured to carry the heat transfer fluid as a working medium to the device or system that is to be operated by the working medium. In certain embodiments the heat output device is configured to carry the heat transfer fluid to a heat exchanger to transfer heat to the working medium which is delivered to the device or system that is to be operated by the working medium.

In various typical embodiments the heat source comprises one or more solar thermal heat sources.

In certain embodiments when the heat produced by the heat source is less than the heat carried by the vapor of the heat transfer fluid resulting in a heat transfer fluid output from the heat source that is a mixture of liquid and vapor. In certain embodiments when heat provided by the heat source is sufficient to change the working fluid from a liquid to a vapor, the system is configured to utilize the vapor phase of the heat transfer fluid as a working fluid and directed to the device or system, or the system is configured to utilize the vapor phase of the heat transfer fluid to transfer heat in a heat exchanger to a working fluid that is directed to the device or system (e.g., a turbine). In certain embodiments the system is configured to also direct the heat transfer fluid into the thermal storage chamber where the heat transfer fluid undergoes a vapor to liquid phase change and transfers heat to the thermal storage material that undergoes a solid to liquid phase change thereby charging the thermal storage material. In certain embodiments the charging power is regulated by adjusting a valve that controls the admittance of a vapor form of the heat transfer fluid into the thermal storage chamber. In certain embodiments the heat transfer fluid condensation mass flow ($q_{HTF}$) is determined using a liquid level meter and/or a mass flow meter, and the $q_{HTF}$ is adjusted to control the thermal charging rate. In certain embodiments the thermal charging rate is measured and/or controlled by measuring and/or controlling the vapor pressure in the thermal storage chamber and/or by measuring and/or controlling the surface temperature of the thermal storage material. In certain embodiments the thermal charging rate is under computer control. In certain embodiments the system is operably linked to or incorporates a computer that receives one or more parameters selected from the group consisting of heat provided from thermal source, flow rate of heat transfer fluid from thermal source, temperature of heat transfer fluid from thermal source, vapor pressure in thermal storage chamber, surface temperature of one or more canisters in the thermal storage chamber, surface temperature of a canister in the thermal storage chamber, vapor temperature of heat transfer fluid in thermal storage chamber, flow rate of heat transfer material leaving thermal storage chamber, temperature of heat transfer material leaving thermal storage chamber, degree of opening or status of one or more valves regulating flow of heat transfer material. In certain embodiments the computer controls and varies one or more operating configurations or parameters selected from the group consisting of valve configuration from a charging to discharging mode or from a discharging to a charging mode, heat transfer fluid flow rate into thermal storage chamber, heat transfer material flow rate out of thermal storage chamber, flow rate through showers in thermal storage chamber, coupling to external heat transfer systems, and coupling to power generation systems. In certain embodiments heat provided by the heat source is not sufficient to change the working fluid from a liquid to a vapor, and the thermal storage system is configured so that the heat transfer fluid from the heat source is valved off from the heat output device, and heat transfer fluid is contacted with the thermal storage material thereby transferring heat from the thermal storage material to the heat transfer fluid to effect a liquid to vapor phase transition of the heat transfer fluid the vapor phase of which is directed to the device or system or directed to a heat exchanger to heat a working fluid that is directed to the device or system (e.g., a turbine). In certain embodiments the discharging power is maintained by adjusting the mass flow of the heat exchange medium. In certain embodiments the system is configured such that discharging power is maintained by measuring the surface temperature of the thermal storage material container, and/or the vapor pressure of the chamber. In certain embodiments the system is configured to maintain a linear relationship between the temperature of the storage container surface and discharging time. In certain embodiments the thermal discharge rate is under computer control.

Also provided are methods of coupling a thermal source to a system or device to be driven by the thermal source. The methods typically comprise coupling heat from the thermal source into a heat storage system (e.g., a latent heat storage system) as described herein; and retrieving heat from the heat storage system to the system or device whereby the heat drives the device. In certain embodiments the heat provided by the heat source is sufficient to change the working fluid from a liquid to a vapor, the vapor phase of the heat transfer fluid is utilized as a working fluid and directed to the device or system or the vapor phase of the heat transfer fluid is directed to a heat exchanger to heat a working fluid that is directed to the device or system. In certain embodiments when heat provided by the heat source is sufficient to change the working fluid from a liquid to a vapor the heated heat transfer fluid is directed into the thermal storage chamber where the heat transfer fluid undergoes a vapor to liquid phase change and transfers heat to the thermal storage material that undergoes a solid to liquid phase change thereby charging the thermal storage material. In certain embodiments when heat provided by the heat source is not sufficient to change the working fluid from a liquid to a vapor, the heat transfer fluid from the heat source is valved off from the heat output device, and heat transfer fluid is contacted with the thermal storage material thereby transferring heat from the thermal storage material to the heat transfer fluid thereby discharging the thermal storage material to effect a liquid to vapor phase transition of the heat transfer fluid the vapor phase of which is directed to the device or system or directed to a heat exchanger to heat a working fluid that is directed to the device or system. In certain embodiments the system or device to be driven by the thermal source comprises a turbine.

Methods are also provided for using a material phase transition from liquid to vapor for heat transfer, heat exchange, and heat conversion to work and using a material phase transition from solid to liquid for heat storage liquid to solid heat storage discharge. The methods typically involve coupling heat from the thermal source into a heat storage system (e.g., a latent heat storage system) as described herein; and retrieving heat from the heat storage system to the system or device to drive the device or system; where heat is transferred into the heat transfer fluid by a liquid to vapor phase transition of the heat transfer fluid, and heat is transferred out of the heat transfer fluid by a vapor to liquid phase transition of the heat transfer fluid; and where heat is transferred into the thermal storage material by a solid to liquid phase transition of the thermal storage medium and heat is transferred out of the thermal storage material by a liquid to solid phase transition of the thermal storage medium. In certain embodiments the heat source (e.g., solar thermal heat source) is sufficient to change the working fluid from a liquid to a vapor, the vapor phase of the heat transfer fluid is utilized as a working fluid and directed to the device or system or the vapor phase of the heat transfer fluid is directed to a heat exchanger to heat a working fluid that is directed to the device or system. In certain embodiments when heat provided by the heat source is sufficient to change the working fluid from a liquid to a vapor the heated heat transfer fluid is directed into the thermal storage chamber where the heat transfer fluid undergoes a vapor to liquid phase change and transfers heat to the thermal storage material that undergoes a solid to liquid phase change thereby charging the thermal storage material. In certain embodiments when heat provided by the heat source is not sufficient to change the working fluid from a liquid to a vapor, the heat transfer fluid from the heat source is valved off from the heat output device, and heat transfer fluid is contacted with the thermal storage material thereby transferring heat from the thermal storage material to the heat transfer fluid thereby discharging the thermal storage material to effect a liquid to vapor phase transition of the heat transfer fluid the vapor phase of which is directed to the device or system or directed to a heat exchanger to heat a working fluid that is directed to the device or system (e.g., a turbine).

In certain embodiments a non-transitory computer readable medium comprising instructions for a computer to control a phase change heat storage system as described herein is provided. In certain embodiments the instructions provide for the computer to regulate charging power by adjusting a valve that controls the admittance of a vapor form of the heat transfer fluid into the thermal storage chamber. In certain embodiments the instructions provide for the determination of the heat transfer fluid condensation mass flow ($q_{HTF}$) from data from liquid level meter and/or a mass flow meter. In certain embodiments the instructions direct the computer to adjust the $q_{HTF}$ to control the thermal charging rate. In certain embodiments the instructions provide for the computer to receive one or more parameters selected from the group consisting of heat provided from thermal source, flow rate of heat transfer fluid from thermal source, temperature of heat transfer fluid from thermal source, vapor pressure in thermal storage chamber, surface temperature of one or more canisters in the thermal storage chamber, surface temperature of a canister in the thermal storage chamber, vapor temperature of heat transfer fluid in thermal storage chamber, flow rate of heat transfer material leaving thermal storage chamber, temperature of heat transfer material leaving thermal storage chamber, degree of opening or status of one or more valves regulating flow of heat transfer material. In certain embodiments the instructions provide for the computer to control and vary one or more operating configurations or parameters selected from the group consisting of valve configuration from a charging to discharging mode or from a discharging to a charging mode, heat transfer fluid flow rate into thermal storage chamber, heat transfer material flow rate out of thermal storage chamber, flow rate through showers in thermal storage chamber, coupling to external heat transfer systems, and coupling to power generation systems. In certain embodiments the instructions provide for determining when the heat provided by the heat source is sufficient to change the working medium from a liquid to a vapor, and/or for causing the computer to configure the thermal storage system so that the vapor phase of the heat transfer fluid is utilized as a working fluid and directed to the device or system, or the vapor phase of the heat transfer fluid is directed to a heat exchanger to heat a working fluid that is directed to the device or system. In certain embodiments the instructions provide for determining when heat provided by the heat source is not sufficient to change the working fluid from a liquid to a vapor, and/or causing the computer to configure the thermal storage system so that the heat transfer fluid from the heat source is valved off from the heat output device, and heat transfer fluid is contacted with the thermal storage material thereby transferring heat from the thermal storage material to the heat transfer fluid to effect a liquid to vapor phase transition of the heat transfer fluid the vapor phase of which is directed to the device or system or directed to a heat exchanger to heat a working fluid that is directed to the device or system. In certain embodiments the instructions cause the computer to determine the thermal charging or discharging rate by measuring the surface temperature of the thermal storage material container, and/or the vapor pressure of the chamber. In certain embodiments the instructions cause the computer to maintain thermal discharging power by adjusting the mass flow of the heat exchange medium. In certain embodiments the instructions cause the computer to maintain a linear relationship between the temperature of the storage container surface and discharging time. In certain embodiments the computer readable medium comprises a medium selected from the group consisting of magnetic media, optical media, flash memory, and programmable logic devices. In certain embodiments the computer readable medium is disposed in a computer or computer system operably connected to a phase change heat storage system.

DETAILED DESCRIPTION

Figure 1:
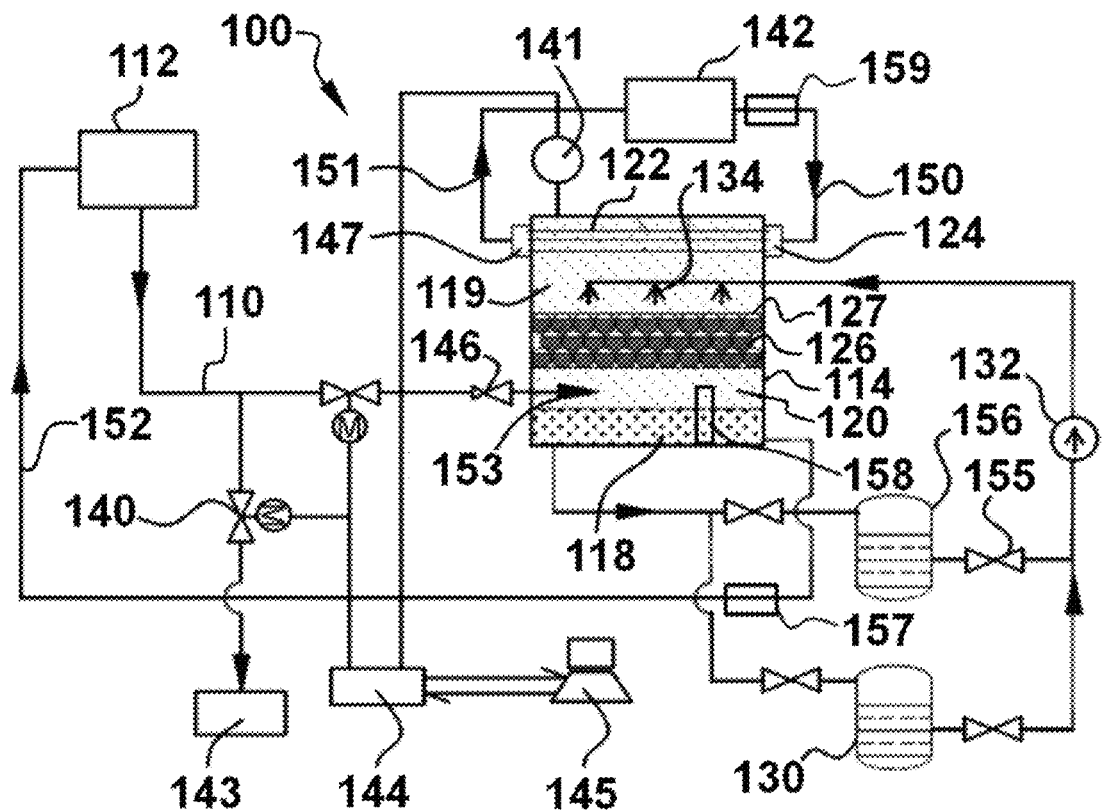
FIG. 1 shows a block diagram of an illustrative system consistent with certain aspects related to the innovations described herein.

In various embodiments, systems and methods that utilize phase change materials for the efficient heat storage, heat exchange, and heat conversion to work are provided. In particular, certain innovations described herein relate to the application of phase change materials (PCMs) as thermal storage materials and/or heat transfer/heat exchange media. In addition, particular methods of controlling such systems especially computer-implemented embodiments of such methods are provided.

In various embodiments aspects of the innovations, such as those set forth in some of the implementations below, may relate to systems and methods of integrating an evaporation-condensation heat exchange mechanism with a phase change latent heat energy storage apparatus, using liquid-gas phase change materials as heat transfer/exchange media and solid-liquid phase change materials as thermal energy storage media.

In certain embodiments methods of controlling such systems and optimizing heat input/output/transfer are provided. While reference is made to particular systems and embodiments, it will be understood that the inventions described herein herein are not limited to any such specific illustrations.

In certain illustrative embodiments, a PCM heat transfer/exchange and thermal storage apparatus may comprise the following components: a main container (e.g., thermal storage chamber), an input heat transfer device that transports heat transfer fluid (HTF) and its heat into the container (thermal storage chamber), an output heat transfer device that transports working medium and its thermal energy out of the container (thermal storage chamber) and/or to a system or device (e.g., a turbine) that is to be driven by the stored/transferred heat, and at least one type of solid-liquid thermal storage material phase change material (PCM). In certain embodiments the solid-liquid thermal storage material is packaged inside one or more secondary canisters/containers in the main (thermal storage) container that act as thermal storage media.

In various embodiments the heat transfer fluid comprises a liquid-gas phase change material (PCM) with its phase transition temperature close to and above the required phase transition of working fluid. In typical embodiments, the systems are configured so that, when sufficient heat is applied to the HTF (i.e., thermal charging conditions), the HTF can enter the main container as a vapor and thermally charge the storage medium. The HTF undergoes a vapor to liquid phase transition while transferring heat to the thermal storage material that undergoes a solid to liquid phase transition.

When sufficient thermal input is unavailable the system discharges stored heat to provided added run time to the attached systems or devices (e.g., turbines). When discharging the thermal storage material, the input entry (for the HTF into the main container from the heat source, e.g., solar thermal source) is closed. A circulating/showering system for liquid-gas PCM HTF is activated to release the thermal energy from storage medium (which undergoes a liquid to solid phase transition) and transfer the energy to working medium. In various embodiments the HTF can act as the working medium, while in other embodiments, the HTF transfers heat via a heat exchanger to the working medium which then drives the attached systems or devices (e.g., turbine(s)). In various embodiments flow control systems and mass flow meters for input HTF, circulating HTF and output working medium are implemented to maintain desired charging and discharging rates.

The operation flow for an illustrative thermal storage system 100 is illustrated in FIG. 1. As illustrated, the system comprises a heat exchanger/storage apparatus including a heat storage chamber (HSC) 114, a heat input device 110 that carries a heat transfer fluid (HTF) from a heat source or collector 112 (e.g., a solar thermal heat source) and injects a vapor form of the HTF 153 through a valve device 146 into the heat storage chamber 114. A phase change thermal storage medium (e.g., a solid-liquid PCM) 126 located within the chamber, and optionally disposed within one or more canisters 127, a heat output device, and a heat exchange system comprising a chamber 156 a valve 155 and a shower/sprayer 134 that delivers a heat exchange medium/fluid 119 to the thermal storage medium 126 and/or showers the heat exchange medium over the thermal storage medium (or canister(s) containing the thermal storage medium. In a charging modality, the vapor form of the HTF may contact surfaces of the thermal storage medium 126 and condense thereon, delivering latent heat from the vapor form of the HTF to the thermal storage medium via a phase change from vapor to liquid. The heat output device can include heat output device surfaces 122 that pass through and are exposed within the heat storage chamber 114. The vapor form of the HTF may also contact these output device surfaces condense thereon and deliver heat. The HTF that is condensed into liquid form can be recirculated 152 out of the chamber back to the heat source or collector 112, such as a heat storage tank.

In various embodiments the heat output device is part of a heat output system, that can also include the output surfaces 122, the working medium/fluid itself 147, exit tubing 151 for the hot working medium/fluid, an optional storage tank 142, and return tubing 150 for the cooled working fluid circulating back into the chamber 114. As indicated above, in various embodiments, the heat exchange system 156/155/134 delivers a heat exchange medium/fluid to the thermal storage material 126 surfaces. The heat exchange system may also include one or more storage tanks 156, 130 as well as various valves 155 and other flow control elements 132. The system 100 may also include computing/processing and control elements, such as, optional data acquisition or processing components 144 and computer terminals 145, GUIs and other user interaction elements, among others. In various embodiments the system 100 can also include a variety of other valves and interconnections as set forth throughout this disclosure, including, for example, a valve 140 that serves to couple the HTF system to adjacent/associated heat transfer systems, such as to a heat storage tank 143 in another such system. In certain embodiments the heat output system can be separated from the storage chamber, and exist as a separated chamber. In this case, the heat output chamber can be separated by an optional valve (not shown in the Figure) from the storage chamber. During the charging process, this valve can be closed off.

To illustrate how to control the charging and discharging thermal energy into and/or from the PCM material in the proposed thermal storage apparatus, the following physical parameters and formulas are considered:

s—position of phase boundary, unit-meter;
R—radius of cylinder contains PCM, unit-meter;
$T_w$—wall temperature of PCM container, °C.;
$T_m$—melting temperature of PCM, °C.;
$T_i$—initial temperature of PCM, °C.;
$T_s$—condensation temperature of heat transfer media
t—time, s;
$\rho_l$—density of PCM at liquid state, ton/m³;
$\rho_s$—density of PCM at solid state, ton/m³;
$L_{pcm}$—latent heat of PCM at melting temperature (fusion heat), kWh/ton;
$L_w$—latent heat of working medium at phase transition temperature g, kWh/ton;
$L_{HTF}$—latent heat of heat transfer medium at phase transition temperature g, kWh/ton;
l—the length of the PCM container, m,
$c_l$—specific heat of PCM in liquid state, kWh/(ton K);
$c_s$—specific heat of PCM in solid state, kWh/(ton K);
$\lambda_l$—thermal conductivity of PCM in liquid state, W/(m K);
$\lambda_s$—thermal; conductivity of PCM in solid state, W/(m K);
dE—energy absorbed or released by PCM within time dt, kWh
dE/dt—energy absorbed or released by PCM in unit time, kW;
C—constant charging power, kW;
D—constant discharging power, kW;
$q_{HTF}$—flow mass in unit time of heat transfer fluid;
$q_{wm}$—flow mass in unit time of working medium; and
x—ratio of vapor to liquid of heat transfer medium at the output of subsystem.

Figure 2:
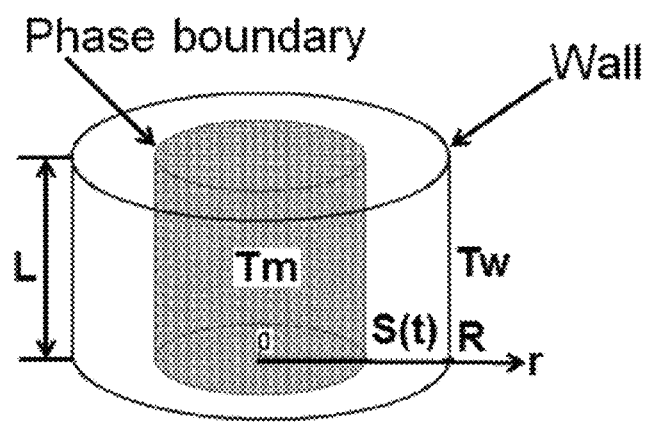
FIG. 2 illustrates a heat storage medium located inside a secondary container during the charging process.

FIG. 2 provides an illustrative diagram of a phase change material (e.g., a thermal storage PCM) packaged into a cylindrical shaped container (canister). In various embodiments this (canister) (typically a plurality of such containers) are located inside the thermal storage chamber. The thermal storage material, e.g., the solid/liquid phase change material PCM, is in solid phase before being charged with thermal energy. During the thermal energy charging process, the solid thermal storage material absorbs thermal energy delivered, for example as the latent heat of heat transfer fluid (HTF) when HTF 153 condenses on the surface of canister wall(s) increasing the wall surface temperature and the temperature of eth phase change material stored in the canister until the thermal storage material reaching its phase change point (sensible heat absorption process). At the phase change transition temperature, the thermal storage material melts upon absorbing the latent heat of the HTF 153. The liquid-solid phase boundary s(t) of the PCM changes (location within the chamber) according to the following formula:

$$s(t) = R - \sqrt{\frac{2\lambda_l(T_w - T_m)t}{\rho_l[L + c_s(T_m - T_i)]}} \quad (1)$$

If the initial temperature (Ti) of the PCM is $T_m$, equation (1) can be simplified to $$s(t) = R - \sqrt{\frac{2\lambda_l(T_w - T_m)t}{\rho_l L}} \quad (2)$$

According to FIG. 2, the energy change within time scale of dt can be expressed as $$dE = 2\pi s \cdot (-ds) \cdot l \cdot \rho_l \cdot L = \left[-\pi l 2\lambda_l(T_w - T_m) + \pi l\sqrt{2\lambda_l}\, R\sqrt{\rho_l L}\, \sqrt{(T_w - T_m)}\, \frac{1}{\sqrt{t}}\right] dt \quad (3)$$

Since $\sqrt{\rho_l L}$ is a large quantity, the first term is far smaller than second term, and it can then be ignored. When the rate of energy change (charging power) remains constant C as function of time, which is desirable in most applications, we have the following relationship:

$$\frac{dE}{dt} \approx \sqrt{2\lambda_1 \rho_l L} \, R\pi l \sqrt{(T_w - T_m)} \, \frac{1}{\sqrt{t}} = C \quad (4)$$

The wall temperature $T_w$ then obeys the following relationship when the charging power is a constant C:

$$T_w - T_m = \left(\frac{C}{R\sqrt{2\lambda_1 \rho_l L}\,\pi l}\right)^2 \quad (5)$$

$$t = \left(\frac{C}{\pi\sqrt{2\rho_l L \lambda_1}\,Rl}\right)^2$$

$$t = \frac{\rho_l R^2 C^2}{2(\rho_l \pi R^2 l)^2 L\lambda_1} t$$

where the mass of the PCM is $$m_{PCM} = \rho_l \pi R^2 l \quad (6)$$

so that $$T_w - T_m = \frac{\rho_l R^2 C^2}{2L\lambda_1 m_{PCM}^2} t \quad (7)$$

Figure 3:
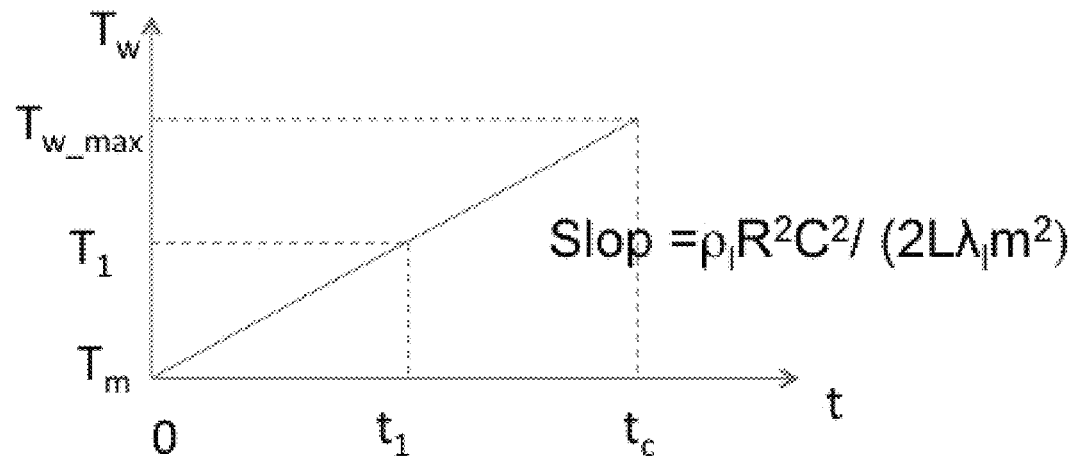
FIG. 3 illustrates the relationship between the wall temperature and the saturated temperature of the HTF vapor in the thermal storage chamber.
Figure 4:
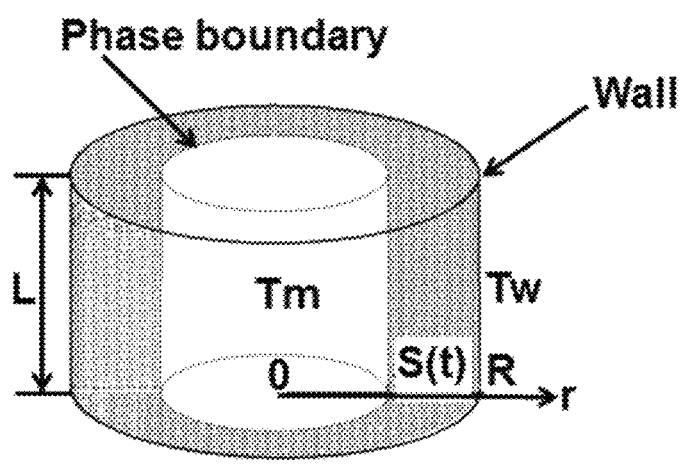
FIG. 4 illustrates the thermal storage medium inside a container during discharging process.
Figure 5:
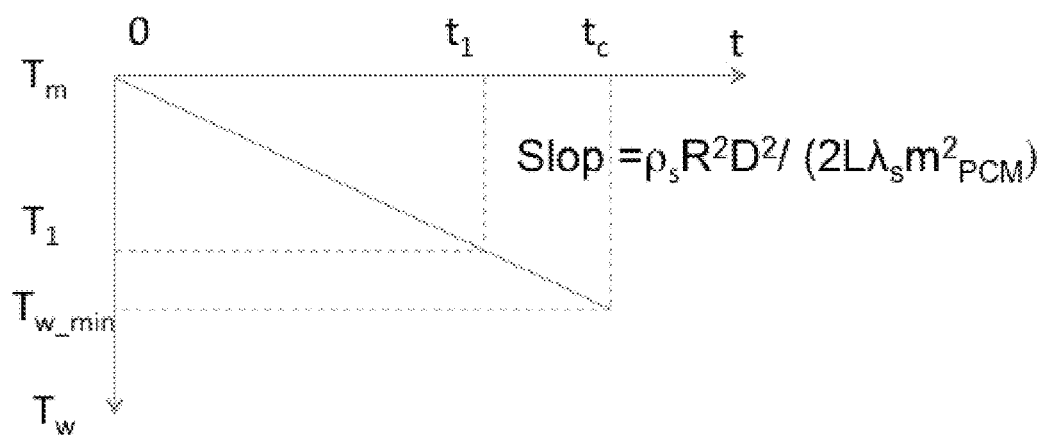
FIG. 5 illustrates the wall temperature as a function of time during discharging process.

As illustrated in FIG. 3, the heat transfer fluid (HTF) vapor 153 transfers its latent heat to the thermal storage PCM 126 as it condenses on the container wall surface, the wall temperature approximately equals to the condensation temperature (Ts) of the vapor. The wall temperature (Tw) can be controlled by valve 146, which controls the pressure (Ps) of the vapor 120, and the corresponding condensation temperature Ts=f (Ps) of the vapor, where f is a single valued function. Thus, according to equation (7), Ts changes linearly as function of time if charging power is a constant C with slope of $[\rho_l R^2 C^2/(2L\lambda_1 m^2_{PCM})]$. Ts_max is defined as the maximum condensation temperature to keep a constant charging power C within time tc.

The condensation temperature typically has a one to one relationship with the saturated pressure:

$$T_s = f(P_s)$$

The incoming vapor pressure before valve 146 entering into the storage container is higher than $P_{s-max}$. The constant charging power C equals the condensation power (rate of latent heat release to the PCM via the container wall) of HTF:

$$C = q_{HTF} L_{HTF}$$

Where $q_{HTF}$ is the condensation mass flow, and $L_{HTF}$ is the latent heat of the heat transfer fluid (HTF). To keep charging power constant, one valve 146 can be varied to maintain $q_{HTF} L_{HTF}$ a constant. This process can be realized by computer with a feedback control logic. If one knows the values of $L_{HFT}$ at different temperature, then required $q_{HTF}$ can be known. In various embodiments the value of $q_{HTF}$ can be measured by liquid level meter 158 and mass flow meter 157. One can also measure the process of the vapor in the chamber, or the surface temperature of PCM container to insure the linear relation of temperature with time in FIG. 3 while controlling the valve 146. This process also be realized by computer feedback control logic/circuitry.

In certain embodiments the process of thermal storage material (PCM) discharge in the chamber can be realized by spraying a liquid phase heat transfer fluid (HTF) onto the surface of the thermal storage PCM containers. As shown in FIG. 3, as the HTF evaporates upon contacting with hot surfaces, the latent heat releases from the melting PCM as it solidifies, and heats the heat transfer fluid through a phase transition into vapor phase. The liquid-solid phase boundary s(t) of the thermal storage material (PCM) changes (moves) according to the formula:

$$s(t) = R - \sqrt{\frac{2\lambda_s (T_m - T_w) t}{\rho_s [L + c_l (T_m - T_i)]}} \quad (10)$$

Again, if one wishes the energy change (charging power) to be constant as function of time, we have:

$$\frac{dE}{dt} \approx R\sqrt{2\lambda_s \rho_s L} \, \pi l \sqrt{(T_m - T_w)} \, \frac{1}{\sqrt{t}} = D \quad (11)$$

and the wall temperature will follow the relationship:

$$T_m - T_w = \frac{\rho_s R^2 D^2}{2L\lambda_s m_{PCM}^2} t \quad (12)$$

The slope is $= rR^2 D^2 / (2L\lambda_s m^2)$. Therefore, the wall temperature should be:

$$T_w - T_m = \frac{\rho_s R^2 D^2}{2L\lambda_s m_{PCM}^2} t \quad (13)$$

During a thermal discharge process, the valve 146 is typically closed. The discharging power D equals the condensation power of the HTF:

$$D = q_{wm} L_{wm} \quad (14)$$

Where $q_{wm}$ is the mass flow of working medium, measured by flow meter 159, $L_{wm}$ is the latent heat of working medium. Discharging power can be maintained by adjusting the mass flow of heat exchange medium controlled by flow control element 132. In certain embodiments this process can be realized through a computer with feedback control logic. Similarly, one can also directly measure the surface temperature of the PCM container, or the vapor pressure of the chamber to insure the linear relationship between temperature of the container surface and discharging time. In various embodiments this process can also be realized by a computer with a feedback control logic.

The following is an example to demonstrate the control of a thermal storage apparatus with constant input and output energy flow, i.e., the charging and discharging of the thermal energy into and from the PCM material. Using $NaNO_3$ for the phase change thermal storage material. Table 1 list relevant physical parameters.

TABLE 1

Relevant physical parameters for NaNO₃ thermal storage phase change material (PCM).

| $\lambda_s$ W/mK | $\lambda_l$ W/mK | L kWh/Ton | $c_l$ kWh/tonK | $\rho_l$ ton/m³ | $\rho_s$ ton/m³ |
|---|---|---|---|---|---|
| 0.5 | 0.5 | 50.5 | 0.5 | 1.95 | 2.26 |

Consider a case, where the latent heat of 1 ton water at temperature of 220° C., which is 516.11 kWh, is to be stored in a thermal storage apparatus within one hour. The charging slope for the wall temperature is $$slop = \frac{\rho_l R^2 C^2}{2L\lambda_l m_{PCM}^2} \quad (15)$$

We can estimate the mass of PCM to store the latent heat of 1 ton water at temperature of 220° C., which is 516.11 kWh, as following:

$$m_{PCM} = \frac{m_{water}L_{water}}{L_{PCM}} = \frac{1 \text{ ton} \times 516.11 \text{kWh/ton}}{50.5 \text{kWh/ton}} = 10.2 \text{ ton}$$

If we choose the radius of the cylindrical container for the PCM as R=0.025 meter, at the charging rate of 516.11 kW, at the end of one hour, the charging should be finished. The charging slope can then be calculated as:

$$slop = \frac{(1.95 \text{ ton/m}^3)(0.025 \text{ m})^2(516.11 \text{kW})^2}{2(50.5 \text{kWh/ton})(0.5 \times 10^{-3} \text{kW/m} \cdot ° \text{C.})(10.2 \text{ ton})^2}$$
$$= 58.0° \text{ C./h}$$

However, if more phase change material is used to store more thermal energy and thereby to extend the charging time at the same charging rate, the rate of temperature change during the charging process can be reduced significantly. For example, at the same 516 kW charging rate, using 5 times PCM, i.e., 51 tons of NaNO₃ material, the charging slope should be:

$$slop = \frac{(1.95 \text{ ton/m}^3)(0.025 \text{ m})^2(516.11 \text{kW})^2}{2(50.5 \text{kWh/ton})(0.5 \times 10^{-3} \text{kW/m} \cdot ° \text{C.})(51 \text{ ton})^2}$$
$$= 23.2° \text{ C./h}$$

At the end of 5 hours, the temperature difference between the PCM packaging steel tube wall and the center of PCM material is:

$|T_m - T_w| = 2.32° \text{ C./h} \times 5h = 11.5° \text{ C.}$

The temperature change slope for the discharging process is very similar. Again, using 51 ton of NaNO₃ PCM material, at the discharging rate of 516 kW, the PCM packaging steel tube wall temperature change slope is $$slop = \frac{(2.26 \text{ ton/m}^3)(0.025 \text{ m})^2(516.11 \text{kW})^2}{2(50.5 \text{kWh/ton})(0.5 \times 10^{-3} \text{kW/m} \cdot ° \text{C.})(51 \text{ ton})^2}$$
$$= 2.7° \text{ C./h}$$

At the end of 5 hours, the temperature difference will be $T_m - T_w = 2.7° \text{ C./h} \times 5h = 13.5° \text{ C.}$ Therefore, for the same charging/discharging rate, by increasing the thermal storage capacity and total charging/discharging time while keep the same charging or discharging rate, one can not only store more thermal energy in the apparatus, one can also decrease the requirements for the temperature difference between the HTF vapor (close to the PCM packaging tube wall temperature) and the PCM phase change temperature. This example also illustrates that although multiple storage containers can be used to satisfy the large heat storage capacity requirement, they should be used in parallel, as much as possible, during the entire solar collecting/charging and discharging time to decrease the slope and minimize the temperature difference requirement for proper charging and discharging. In summary, using the above described method, one can control the gas phase temperature of the heat transfer media to regulate the charging or discharging rate at will.

In the following, we describe how such as system can also accommodate different charging and discharging rates at a certain ranges based on the incoming thermal energy variation due to solar energy variation, and the thermal energy variation from various demands. In most cases, we can treat the gas phase of the heat transfer media as an ideal gas. According to the ideal gas law $$PV = nRT \quad (16)$$

where P is the pressure, V is the volume, n is the number of moles for the ideal gas, R is the atmospheric constant, T is the ideal gas temperature. This relationship indicates that for a given volume of the thermal storage chamber, the temperature and pressure of the gas phase in the chamber have a one to one relationship. For a given thermal storage system, using above described phase changing material as thermal storage media and the charging and discharging process model described above, the charging and discharging process can be easily controlled and balanced.

As an example, consider the following situation where the input thermal energy comes from a solar thermal energy-collecting field. The incoming energy rate (charging rate) depends on the intensity of the solar radiation. When the solar radiation intensity increases, more thermal energy is collected and is delivered into the thermal storage chamber. If this charging rate is higher than the intrinsic charging rate in the thermal storage chamber determined by equation (15) above, i.e., the temperature difference between the gas phase temperature $T_g = T_w$ and the PCM phase change temperature $T_m$, the total surface area of the PCM packaging (e.g., steel tubing), the density of the PCM in liquid phase, the thermal conducting coefficient of the PCM liquid phase, the latent heat, and the total PCM material, the gas phase pressure will increase in the storage chamber, causing increase of the gas phase temperature T. This increase in the temperature difference will result in a higher charging rate, until a new balance is established when the gas phase pressure in the thermal storage chamber is stabilized. Similarly, when the solar radiation intensity decreases, less thermal energy is collected and is delivered into the thermal storage chamber. In this case, the temperature difference will decrease resulting in a slower charging rate until the pressure in the thermal storage chamber is stabilized.

Similarly, during the thermal discharging process, as long as we kept spraying enough liquid phase HTF onto the packaged PCM material to produce HTF vapor in the storage chamber, depending on the amount of thermal energy required, the pressure of the gas phase of HTF was increased or decreased so that the temperature of the gas phase HTF also increases or decreases. Therefore, the heat exchange temperatures difference between the gas phase HTF and the heat exchanger for steam generation (such as preheating of water and water evaporation in the Rankin Cycle) will also be changed according to the demand until the new balance is reached in the thermal storage chamber.

Figure 6A:
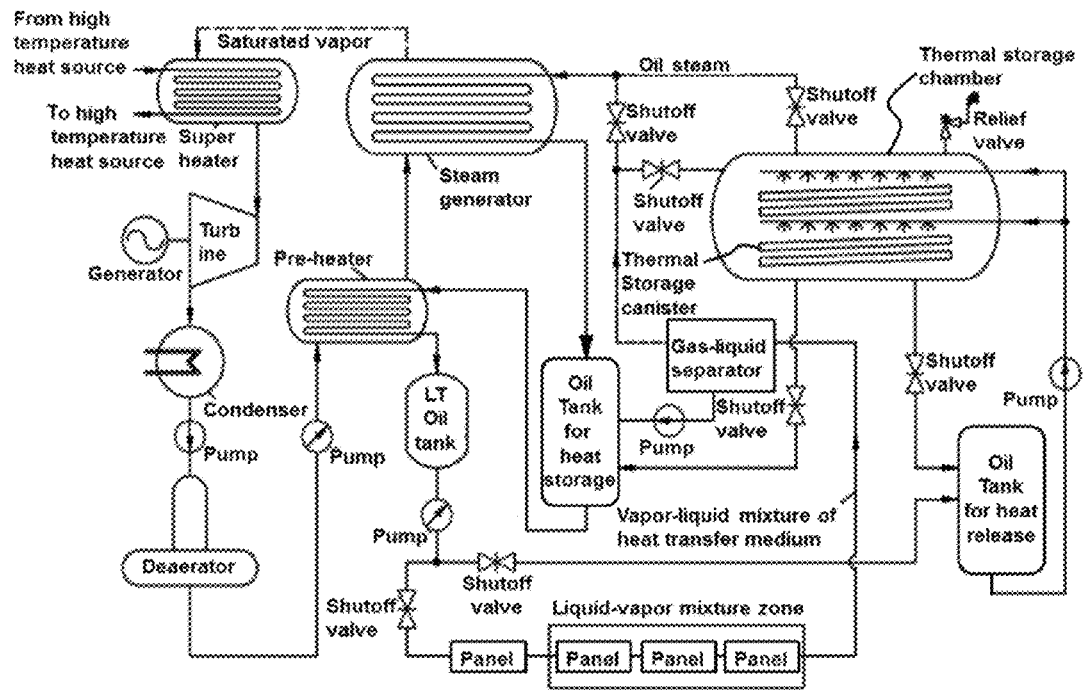
FIGS. 6A, 6B, and 6C schematically illustrate various embodiments of a solar power plant application of the systems described herein.
Figure 6B:
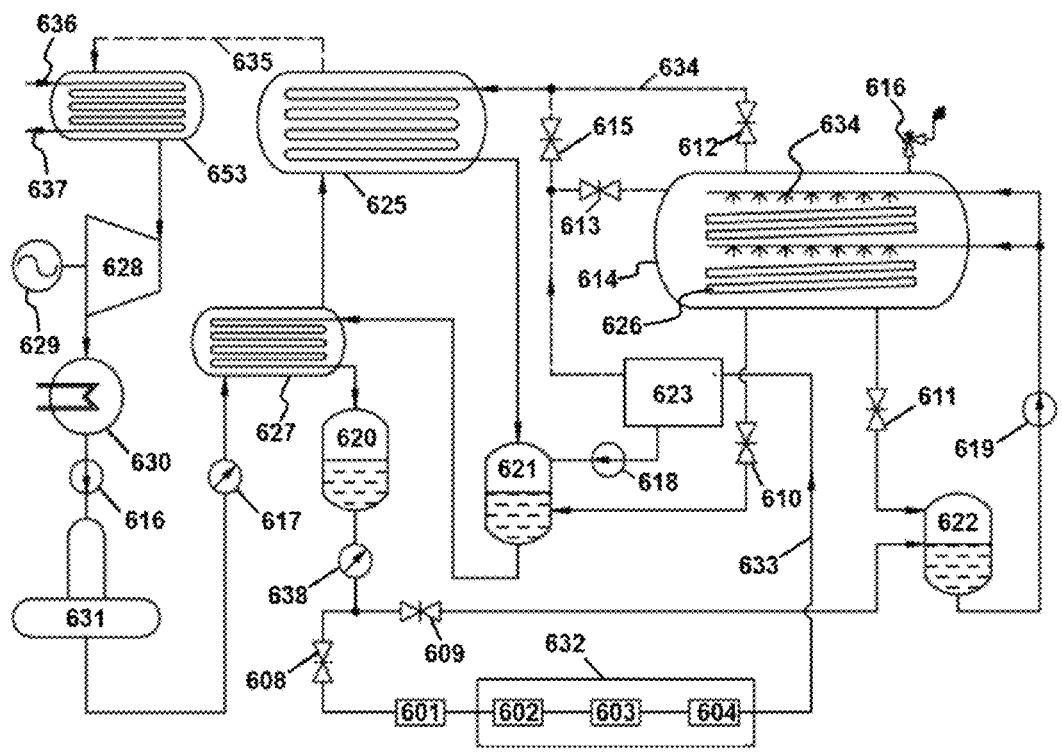

FIGS. 6A and 6B illustrate another embodiment of the systems and methods for phase change thermal storage and associated heat transfer and exchange. Following is a description on how this system operates. A mechanical pump 638 pumps the heat transfer fluid (HTF) out from the bottom part of a low temperature HTF tank 620. The HTF passes valve 608 and enters solar array 632 comprising panels (601 to 604), where the HTF is heated up and typically partially vaporized in the solar array subsystem (e.g., comprising solar collectors 602 to 604, and optionally 601) resulting in an HTF that comprise both gas and liquid phases. The gas and liquid phases of the HTF are separated into a high temperature liquid phase and a gas upon entry into a gas-liquid separator 623. Another pump 618 pumps the high temperature liquid phase HTF into high temperature HTF tank 621 while the gas phase HTF enters steam generator 625 when shutoff valves 612 and 613 are turned off and shutoff valve 615 is turned on. In the steam generator heat exchanger 625, HTF is condensed into liquid phase while delivering its latent heat to the working fluid (in most cases water), to convert the liquid phase working fluid into steam. The HTF condensed in the steam generator 625 flows into high temperature HTF tank 621. The liquid phase HTF in the tank 621 can be directed into pre-heater 627 to heat the working fluid temperature up to its saturated temperature given its saturated pressure before it becomes steam. The output HTF from the pre-heater 627 enters the low temperature HTF tank 620, ready for the next cycle.

Alternatively, when the shutoff valves 612 and 615 are turned off and shutoff valve 613 is turned on, the gas phase HTF from the gas-liquid phase separator 623 enters thermal storage container 624. The gas phase HTF condenses on the PCM material surfaces e.g., surfaces of canisters 626 containing the phase change thermal storage material) to release its latent heat. The thermal storage phase change material (PCM) is charged according to equation (5) to (7). As mentioned above, the pressure and the temperature of HTF inside the thermal storage tank will regulate itself due to thermal dynamics until the balance is reached. During the charging process, the temperature of PCM can be monitored. Initially, it will increase linearly as a function of time before its solid-phase transition temperature is reached because this is a sensible heat charging process. When the temperature of PCM reaches its phase change temperature, the temperature of the thermal storage PCM stays constant until all the material changes phase—this is the phase change charging process. When the temperature of the PCM increases again, it indicates that substantially all of the phase change storage material has changed phase (e.g., from solid to liquid) and the phase change charging process has finished. At this point, the shutoff valve 613 is typically turned off. The gas phase HTF from the gas-liquid separator 623 can then be diverted back to the steam generator 625, e.g., by closing valves 612 and 613 and opening valve 615 is turned as described above. Alternatively the gas phase HTF from the gas-liquid separator 623 can then be diverted into another thermal storage chamber (not shown here) that is in parallel with the storage chamber 624. The relief valve 614 on the top of tank 624 is a safety device to prevent over pressure in the tank 624.

After the thermal storage phase change material (PCM) in the thermal storage chamber (tank 624) is charged, it is ready to release (discharge) heat when there is a need (e.g., when insolation is low). During the discharge process, a pump 619 pumps HTF from tank 622 to thermal storage chamber (tank 624). The HTF can be sprayed over the thermal storage material (or canisters containing the thermal storage material) via sprayer devices 634. In certain embodiments the sprayer devices 624 are configured to provide falling film heat transfer across the surface of the thermal storage material (or canisters 626). When the HTF contacts the surface(s) of the PCM (e.g., PCM canister 626), the droplets are heated up and vaporized. After the pressure in the tank 624 reaches a per-determined level, valve 612 is turned on while valve 613 is turned off. If the solar radiation intensity is low due to clouds or in the evenings, so that there is no supply of gas phase HTF from the gas-liquid separator 623, the shutoff valve 615 is also turned off. Otherwise, the valve 615 can be turned on so that both the solar arrays and the thermal storage tank supply the HTF vapor to the steam generator 625. During the discharge process, when the HTF level in the tank 622 drops to a pre-determined level (lower mark), a pump 609 pumps HTF from tank 620 into tank 622 until the HTF level inside tank 622 rises to a pre-determined level (higher mark), turns off the pump 609. In the steam generator heat exchanger 625, HTF is condensed into liquid phase while delivering its latent heat to the working fluid (e.g., water), to convert the liquid phase a vapor phase (e.g., steam). The condensed HTF flows into high temperature HTF tank 621. The liquid phase HTF in the tank 621 flows into pre-heater 627 to heat the working fluid temperature up to its saturated temperature given its saturated pressure before it becomes steam. The output HTF from the pre-heater 627 enters the low temperature HTF tank 620, ready for the next cycle. The discharge process lasts until the PCM temperature starting to drop when pump 619 stops and the valve 612 is turned off.

The steam generated in heat exchanger (steam generator) 625 can be directed to an optional superheater 653 and to a device such as a turbine 628, optionally operating a generator 629. The steam from the turbine 628 can be recovered through an optional condenser 630 and optional deaerator 631 and delivered via a pump 617 to preheater 627.

In certain embodiments, the sensible heat of the PCM materials can also be utilized at lower temperature, such as to pre-heat the working fluid; to keep the HTF warm during the night to prevent it becomes solid in the solar field, and/or many other lower temperature thermal applications. In this case, the spray and vaporization process can be continued until the temperature of HTF drops to such a low level that not enough HTF vapor can be produced in the tank 624.

Figure 6C:
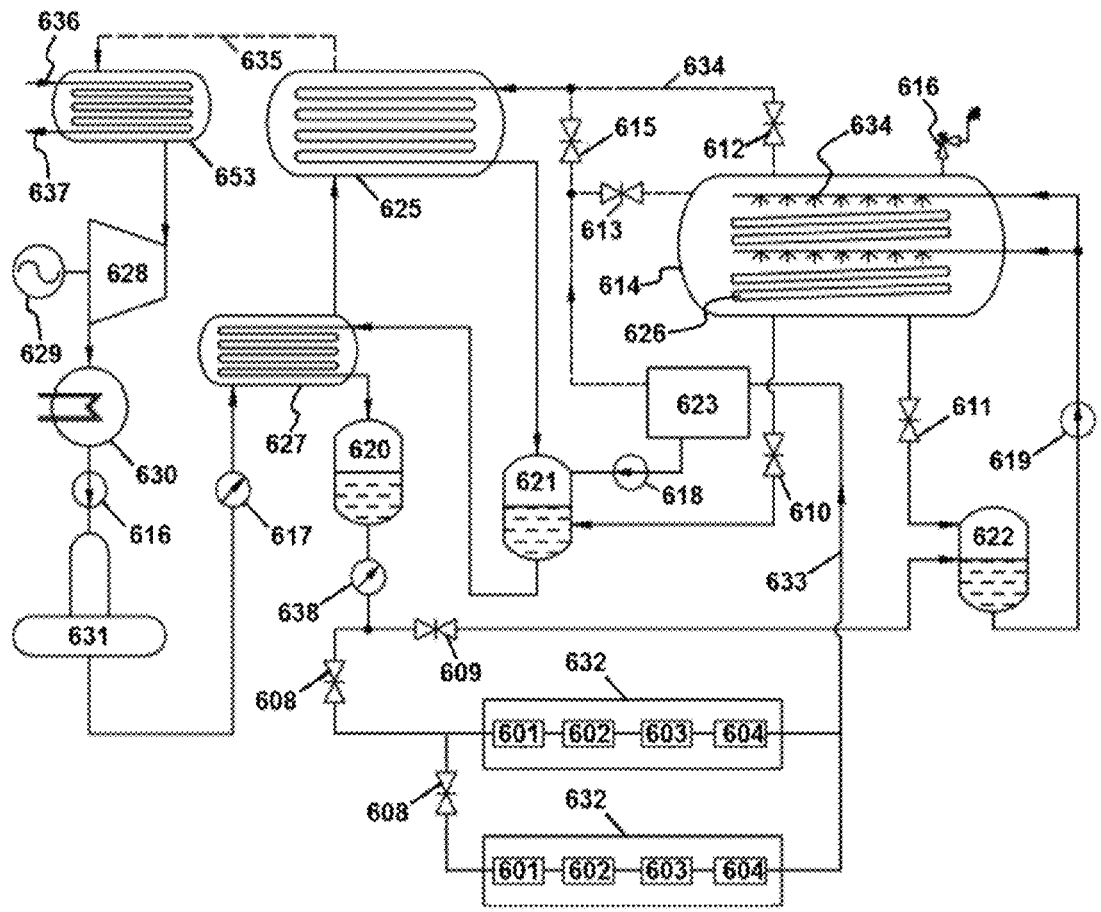

As illustrated in FIGS. 6A and 6B, the input heat source is the vapor form of the heat transfer fluid (HTF). The HTF transfers the heat from a heat source, e.g., an array of solar collectors as illustrated in the Figures. In certain embodiments solar collectors 601 through 604 form a subsystem 632 of serial connected solar collector panels, and solar arrays can be formed by multiple subsystems connected in parallel to deliver the HTF at a range of desired temperatures, e.g. as illustrated in FIG. 6C. In various embodiments the subsystem(s) are designed in such way that total converted solar power of a subsystem at a pre-determined maximum solar radiation density is less than the heat carried by the vapor of the HTF at a fixed mass flow rate in the subsystem:

$$E_{max} \leq \frac{L_{HTF} m_{HTF}}{\eta(T_1) NA}$$

Where $E_{max}$ is the given maximum direct normal radiation (DNI) level, N is the number of collector panels in a subsystem within phase transition zone, A is the effective collector area of each panel, and $\eta(T_1)$ is the solar to heat conversion efficiency of each panel at the HTF phase transition temperature $T_1$. As the consequence, the output heat transfer fluid (HTF) at the end of the serial connected subsystem is always a mixture of liquid and vapor, i.e. the mass ratio of vapor to the total mass of heat transfer medium at the output of subsystem, x, will always be less than 1.

When available insolation (solar power) is less than the pre-determined maximum solar radiation density, if one does not change $m_{HTF}$, the ratio x will decrease, while the saturated vapor temperature will be kept at the same temperature. This HTF vapor direct generation feature protects the heat transfer medium from being over heated and carbonized when solar radiation fluctuates due to the nature of phase transition and a wide range of ratio x. For higher efficiency operation, one can control the mass flow $m_{HTF}$ accordingly while keep the ratio x unchanged. During operation of the system, if the solar radiation level is high enough the solar arrays can provide enough thermal energy to generate steam at the required temperature and flow rate for the steam turbine, the shutoff valves 613 and 615 are typically opened to start steam turbine operation. This process can work when the process to work, HTF phase change temperature $T_1$ is only about 10° C. to 20° C. higher than the steam generation temperature for the heat exchanger steam generator. This is because the high efficiency of the heat transfer process during gas phase HTF condensation in the steam generation heat exchanger.

As the solar radiation level further increases, extra HTF vapor generation of solar arrays will force $T_1$ to increase to temperature higher than $T_m$, the thermal energy and the charging process will start. The saturated vapor temperature will increase accordingly to increase the charging rate until new thermal dynamic balance is reached. Therefore, the charging temperature and charging rate do not need to be controlled. When the insolation level is low, e.g., the solar arrays cannot provide enough thermal energy to generate required steam for the steam turbine, the valve 613 is closed, and the valve 612 is opened while the thermal storage tank is working in the discharging mode. In this case, both solar arrays and the thermal energy storage tank are producing HTF vapor for the steam generation heat exchanger, ensuring that the steam turbine has enough incoming steam. The discharging process will operated as described previously. During the evenings or other time period when there is no solar radiation, the valves 613 and 615 are closed, valve 612 is opened while the thermal storage tank operating at its discharging mode. The generated HTF vapor will generate required steam via the steam generator 625.

With this method of utilizing phase transition latent for all heat transfer, storage and working media, the average operation temperature of solar collectors and storage apparatus is much lower than that in systems where sensible heat transfer and storage methods are used. As the consequence, the methods and apparatus described herein are much more efficient than systems that utilize sensible heat for heat transfer, and/or for storage, and/or for working media.

There are a number of materials can be used as the heat transfer fluid (HTF), the phase change thermal storage material, and the working fluid in the methods and systems described herein.

As indicated above, in certain embodiments, it, it is desirable to utilize a heat transfer fluid with transition temperature (e.g., liquid to gas transition temperature) at or slightly above the working (transition) temperature of the phase change thermal storage material and/or the working fluid. Moreover the heat transfer fluid and the thermal storage medium are in various embodiments both phase change materials (e.g., a liquid/gas PCM for the HTF, and a solid/liquid PCM for the thermal storage material).

Suitable heat transfer fluids (HTFs) include, but are not limited to materials such as water, various natural or synthetic oils, ionic fluids, and the like. Illustrative HTF materials include, but are not limited to those shown in Liquids with large temperature span, such as water, synthetic oils, ionic fluids, etc., may be used as the HTF for thermal energy input. Working fluids (WFs), which may be water, though can also be ammonia, organic solutions, and many other choices of liquid with desired properties, are typically used for thermal energy output. Examples of such fluid are set forth in Table 2.

TABLE 2

Illustrative heat transfer fluids and/or working fluids and/or fluid, and heat exchange media.

| Class | Component | Mol. Wt. | BOILING POINT K (TB) | HEAT VAPOR NORMAL BP CAL/G-MOLE |
|---|---|---|---|---|
| Low Boiling Substances | Chloroform | 119.378 | 334.3 | 7100 |
| | Methanol | 32.042 | 337.8 | 8426 |
| | Acetyl Chloride | 78.498 | 323.9 | 6850 |
| | Cyclopentane | 70.080 | 322.3 | 6536 |
| | Propionaldehyde | 58.080 | 321.0 | 6760 |
| | N-Propyl Amine | 59.112 | 321.8 | 7100 |
| | 2,3-Dimethyl-1-Butene | 84.162 | 328.8 | 6550 |
| Mid Boiling Substances | O-Ethylphenol | 122.167 | 477.7 | 11490 |
| | Ethyl Benzoate | 150.178 | 485.9 | 10700 |
| | 1,2,3,4-Tetrahydro-naphthalene | 132.206 | 480.7 | 9490 |
| | N-Hexylcyclo-pentane | 154.297 | 476.3 | 9840 |
| | 1-Dodecene | 168.324 | 486.5 | 10270 |
| | Vp-1 Heat Transfer Oil | 166.000 | 530.0 | 11171 |
| High Boiling Substances | N-Octadecane | 254.502 | 589.5 | 13020 |
| | N-Pentadecylcyclo-pentane | 280.540 | 625.0 | 13780 |
| | 1-Eicosanol | 298.555 | 629.0 | 15600 |

Suitable working fluids include, but are not limited to materials such as water, ammonia, various organic solutions, and the like.

Illustrative solid/liquid phase change materials suitable for the heat storage material include, but are not limited to a paraffin, a fatty acid, a polyethylene glycol (or other large chain alcohol), and a salt (e.g., an anhydrous salt). The phase change thermal storage material will be selected based on desired transition temperature and the effective heat capacity.

Illustrative solid/liquid phase change materials having a relatively low transition temperature and believed to be suitable for the heat storage material include, but are not limited to those shown in Table 3.

TABLE 3

Illustrative low temperature phase change materials for thermal storage medium.

| Class | Compound | Melting Point °C. |
|---|---|---|
| Salt | $LiNO_3*3H_2O$ | 30 |
| | $Na_2SO_4*10H_2O$ | 32.4 |
| | $Na_2CO_3*10H_2O$ | 33 |
| | $Na_2HPO_4*10H_2O$ | 36 |
| | $Na_2S_2O_3*5H_2O$ | 48 |
| | $Na(CH_3COO)*3H_2O$ | 58 |
| | $Na_2P_2O_4*10H_2O$ | 70 |
| | 50%$Na(CH_3COO)*3H_2O$ + 50%$HCONH_2$ | 40.5 |
| | $Ba(OH)21*8H_2O$ | 78 |
| Paraffin | C16~C28 | 42~44 |
| | C20~C33 | 48~50 |
| | C20~C45 | 58~40 |
| | C21~C50 | 66~68 |
| | sliceable paraffin | 64 |
| Fatty acids | lauric acid | 42~44 |
| | tetradecanoic acid | 49~51 |
| Products in commercial use | cetylic add | 63 |
| | stearic acid | 70 |
| | ClimSel C32 (hydrous salt) | 32 |
| | RT40 (paraffin) | 43 |
| | STL47 (hydrous salt) | 47 |
| | ClimSel C48(hydrous salt) | 48 |
| | STL52 (hydrous salt) | 52 |
| | RT50 (paraffin state) | 54 |
| | STL55 (hydrous salt) | 55 |
| | TH58 (hydrous salt) | 58 |
| | ClimSel C48 (hydrous salt | 58 |
| | RT65 (paraffin) | 64 |

In various embodiments higher (high) temperature phase change materials are preferred as the thermal storage material. Illustrative high temperature phase change materials believed to be suitable for the heat storage material include, but are not limited to those shown in Table 4.

TABLE 4

Illustrative higher temperature phase change materials suitable for thermal storage.

| Substance 1 | (mol %) | Substance 2 | (mol %) | Substance 3 | (mol %) | Substance 4 | (mol %) | Melting Point °C. |
|---|---|---|---|---|---|---|---|---|
| NaF | 76.1 | $CaF_2$ | 14.4 | $MgF_2$ | 76.1 | | | 745 |
| $Na_2CO_3$ | 56.6 | $K_2CO_3$ | 43.4 | | 56.6 | | | 710 |
| $CaCl_2$ | 38.5 | $CaSO_4$ | 11 | $CaMoO_4$ | 38.5 | | | 673 |
| KBr | 65 | $K_2MoO_4$ | 35 | | 65 | | | 625 |
| NaCl | 38.5 | NaBr | 23 | $Na_2MoO_4$ | 38.5 | | | 612 |
| KCl | 45 | KF | 55 | | 45 | | | 605 |
| KF | 40 | KBr | 60 | | 40 | | | 576 |
| NaCl | 95.2 | $NiC_{12}$ | 4.8 | | 95.2 | | | 573 |
| $BaCl_2$ | 27.9 | KCl | 39.8 | $CaCl_2$ | 27.9 | | | 551 |
| $Li_2CO_3$ | 27.6 | $Na_2CO_3$ | 57.6 | $K_2CO_3$ | 27.6 | | | 550 |
| $Li_2CO_3$ | 33.2 | $Na_2CO_3$ | 16.8 | $K_2CO_3$ | 33.2 | | | 550 |
| $BaCl_2$ | 26.6 | KCl | 39.3 | NaCl | 26.6 | | | 542 |
| $MgCl_2$ | 49.5 | $SrCl_2$ | 50.5 | | 49.5 | | | 535 |
| KCl | 44.7 | KF | 33 | $K_2CO_3$ | 44.7 | | | 528 |
| NaCl | 5 | NaBr | 40 | $Na_2MoO_4$ | 5 | | | 524 |
| KCl | 24.8 | NaF | 35.7 | $K_2CO_3$ | 24.8 | | | 520 |
| NaF | 2 | NaBr | 43 | $Na_2MoO_4$ | 2 | | | 506 |
| $CaCl_2$ | 51.3 | KCl | 5.8 | NaCl | 51.3 | | | 504 |
| $CaCl_2$ | 55.1 | KCl | 15.6 | NaCl | 55.1 | | | 504 |
| $CaCl_2$ | 52.8 | NaCl | 47.2 | | 52.8 | | | 500 |
| $CaCl_2$ | 70 | NaCl | 30 | | 70 | | | 500 |
| NaCl | 48.3 | $CaCl_2$ | 51.7 | | | | | 500 |
| KCl | 50 | $MnCl_2$ | 50 | | | | | 494 |
| $CaCl_2$ | 50 | $CaF_2$ | 1.5 | NaF | 50 | | | 490 |
| KCl | 50 | MgCl2 | 50 | | 50 | | | 487 |
| $CaCl_2$ | 22.4 | KCl | 31 | $MgCl_2$ | 22.4 | | | 487 |
| $BaCl_2$ | 9.3 | $CaCl_2$ | 22.2 | NaCl | 9.3 | KCl | 42.7 | 479 |
| $BaCl_2$ | 13.1 | $CaCl_2$ | 16.9 | NaCl | 22.7 | KCl | 47.3 | 478 |
| $BaCl_2$ | 8.7 | KCl | 52.3 | $MgCl_2$ | 18.2 | NaCl | 20.7 | 475 |
| KCl | 41.6 | $MgCl_2$ | 58.4 | | | | | 473 |
| $Na_2SO_4$ | 45 | $ZnSO_4$ | 55 | | | | | 472 |
| $MgCl_2$ | 51.3 | KCl | 48.7 | | | | | 470 |
| $CaCl_2$ | 50 | KCl | 7.25 | NaCl | 42.75 | | | 465 |
| $MgCO_3$ | 55 | $K_2CO_3$ | 45 | | | | | 460 |
| $CaCl_2$ | 41.6 | KCl | 8.1 | NaCl | 41.3 | NaF | 2.9 | 460 |
| $CaCl_2$ | 41.6 | KCl | 2.2 | $MgCl_2$ | 8.8 | NaCl | 47.4 | 460 |
| NaCl | 56.9 | $MgCl_2$ | 43.1 | | | | | 459 |
| KCl | 37.5 | $MnCl_2$ | 62.5 | | | | | 456 |
| KCl | 35 | $MnCl_2$ | 65 | | | | | 450 |
| $MgCl_2$ | 40 | NaCl | 60 | | | | | 450 |
| $MgCl_2$ | 38 | NaCl | 62 | | | | | 450 |
| $MgCl_2$ | 39.91 | NaCl | 60.09 | | | | | 450 |
| $MgCl_2$ | 64 | KCl | 36 | | | | | 448 |
| $MgCl_2$ | 43.8 | NaCl | 56.2 | | | | | 442 |

TABLE 4-continued

Illustrative higher temperature phase change materials suitable for thermal storage.

| Substance 1 | (mol %) | Substance 2 | (mol %) | Substance 3 | (mol %) | Substance 4 | (mol %) | Melting Point ° C. |
|---|---|---|---|---|---|---|---|---|
| $MgCl_2$ | 33.4 | KCl | 66.6 | | | | | 435 |
| $ZnCl_2$ | 31.8 | KCl | 68.2 | | | | | 432 |
| $MgCl_2$ | 44 | NaCl | 56 | | | | | 430 |
| KCl | 65.3 | $MgCl_2$ | 34.7 | | | | | 429 |
| NaCl | 54 | $MgCl_2$ | 46 | | | | | 425 |
| KCl | 69.8 | $MgCl_2$ | 30.2 | | | | | 423 |
| KCl | 67 | $MgCl_2$ | 33 | | | | | 417 |
| $MnCl_2$ | 37.7 | NaCl | 25 | KCl | 37.3 | | | 400 |
| $Li_2CO_3$ | 43.4 | $K_2CO_3$ | 25 | $NaCO_3$ | 31.6 | | | 397 |
| $MgCl_2$ | 50 | KCl | 20 | NaCl | 30 | | | 396 |
| $MgCl_2$ | 51 | KCl | 22 | NaCl | 27 | | | 396 |
| KCl | 58 | $FeCl2$ | 42 | | | | | 393 |
| KCl | 49.7 | $MnCl_2$ | 22.4 | NaCl | 27.9 | | | 390 |
| $MgCl_2$ | 45.4 | NaCl | 33 | KCl | 21.6 | | | 385 |
| $Na_2SO_4$ | 28.4 | $K_2SO_4$ | 17.4 | $ZnSO_4$ | 54.2 | | | 385 |
| $MgCl_2$ | 63.7 | NaCl | 22.3 | KCl | 14 | | | 385 |
| KCl | 56.6 | $MnCl_2$ | 30 | NaCl | 13.4 | | | 380.95 |
| KOH | | | | | | | | 380 |
| KCl | 22.4 | $MgCl_2$ | 50.86 | NaCl | 27 | | | 380 |
| NaCl | 56 | $FeCl_2$ | 44 | | | | | 376 |
| KOH | 94 | $K_2SO_4$ | 6 | | | | | 376 |
| NaOH | 73 | NaCl | 27 | | | | | 370 |
| NaOH | 73.2 | NaCl | 26.8 | | 73.2 | | | 369 |
| KOH | 89.7 | K2CO3 | 10.3 | | | | | 365.5 |
| NaCl | 19.8 | NaOH | 80.2 | | | | | 363 |
| NaOH | 67.78 | NaCl | 23 | $Na_2CO_3$ | 9.22 | | | 358.85 |
| KCl | 50.84 | MgCl2 | 35.35 | NaCl | 13.81 | | | 357 |
| LiCl | 59.2 | KCl | 40.8 | | | | | 352.5 |
| KCl | 28.7 | $MnCl_2$ | 45 | NaCl | 26.3 | | | 350 |
| KCl | 39 | $FeCl_2$ | 61 | | | | | 350 |
| $KNO_3$ | 80 | KBr | 10 | KCl | 10 | | | 342 |
| KCl | 46 | $MgCl_2$ | 32 | NaCl | 22 | | | 339.1 |
| $KNO_3$ | | | | | | | | 335 |
| KCl | 33.5 | $MgCl_2$ | 33.5 | NaCl | 33 | | | 332.55 |
| KCl | 32 | $MgCl_2$ | 37.6 | NaCl | 30.4 | | | 331.87 |
| KCl | 40.6 | $MgCl_2$ | 34.3 | NaCl | 25.1 | | | 331.31 |
| $KNO_3$ | 99.9 | LiOH | 0.1 | | | | | 330 |
| $KNO_3$ | 92.4 | KBr | 7.6 | | | | | 329.84 |
| $KNO_3$ | 96.3 | $Na_2CO_3$ | 3.7 | | | | | 325.73 |
| NaOH | 72.3 | NaCl | 20.5 | $Na_2CO_3$ | 7.2 | | | 320.39 |
| NaOH | 77.2 | NaCl | 16.2 | $Na_2CO_3$ | 6.6 | | | 318 |
| NaOH | | | | | | | | 318 |
| NaNO3 | | | | | | | | 308 |
| $KNO_3$ | 90.5 | KCl | 9.5 | | | | | 308 |
| $NaNO_3$ | 98 | $Na_2CO_3$ | 2 | | | | | 307 |
| $NaNO_3$ | 96.5 | NaF | 3.5 | | | | | 303 |
| NaCl | 6.6 | $NaNO_3$ | 93.4 | | | | | 298 |
| NaOH | 85.8 | NaCl | 7.8 | $Na_2CO_3$ | 85.8 | | | 298 |
| $NaNO_3$ | 95 | $Na_2SO_4$ | 5 | | | | | 296 |
| NaOH | 94 | $Na_2SO_4$ | 6 | | | | | 294 |
| NaOH | 87.3 | NaCl | 6.1 | $Na_2CO_3$ | 6.6 | | | 291 |
| NaCl | 8 | NaF | 5 | $NaNO_3$ | 87 | | | 288 |
| $NaNO_3$ | 86.3 | NaCl | 8.4 | $Na_2SO_4$ | 5.3 | | | 287 |
| $Na_2CO_3$ | 8 | NaOH | 92 | | | | | 286 |
| NaOH | 88.3 | NaCl | 5.3 | $Na_2CO_3$ | 6.4 | | | 282 |
| NaNO3 | 99 | NaOH | 1 | | | | | 271 |
| NaNO3 | 98 | NaOH | 2 | | | | | 270 |
| $NaNO_3$ | 41 | NaOH | 59 | | | | | 266 |
| $NaNO_3$ | 50 | NaOH | 50 | | | | | 265 |
| KCl | 28 | $ZnCl_2$ | 72 | | | | | 264 |
| $NaNO_3$ | 19.4 | NaOH | 80.6 | | | | | 258 |
| $NaNO_3$ | 18.5 | NaOH | 81.5 | | | | | 257 |
| $NaNO_3$ | 61.5 | NaOH | 28.5 | | | | | 250 |
| $NaNO_3$ | 70 | NaOH | 30 | | | | | 247 |
| $NaNO_3$ | 72 | NaOH | 28 | | | | | 247 |
| NaOH | 55.6 | NaCl | 4.2 | $NaNO_3$ | 40.2 | | | 247 |
| $NaNO_3$ | 18.3 | NaCl | 3.6 | NaOH | 18.3 | | | 242 |
| NaOH | 30 | $NaNO_3$ | 70 | | | | | 247 |
| $NaNO_2$ | 27 | NaOH | 73 | | | | | 237 |
| $NaNO_2$ | 80 | NaOH | 20 | | | | | 232 |
| $NaNO_3$ | 54 | NaOH | 46 | | | | | 222 |

TABLE 4-continued

Illustrative higher temperature phase change materials suitable for thermal storage.

| Substance 1 | (mol %) | Substance 2 | (mol %) | Substance 3 | (mol %) | Substance 4 | (mol %) | Melting Point ° C. |
|---|---|---|---|---|---|---|---|---|
| NaNO$_3$ | 50 | KNO$_3$ | 50 | | | | | 220 |
| NaNO$_3$ | 6.9 | KNO$_3$ | 44.2 | NaNO$_2$ | 48.9 | | | 142 |
| NaOH | 28 | NaNO$_3$ | 72 | | | | | 246'-.247 |

Further, solid-liquid phase PCM storage materials can be many choices of inorganic and organic PCM materials with desired transition temperature and effective heat capacity. Examples of such PCMs are set forth in Table 3 for low phase transition temperatures and Table 4 for high phase transition temperatures. As indicated above, in certain preferred embodiments, the solid-liquid PCMs are usually packaged in secondary containers/canisters, in desired shapes and sizes. In certain embodiments these canisters can be positioned on layered shelves in the main container.

Figure 7:
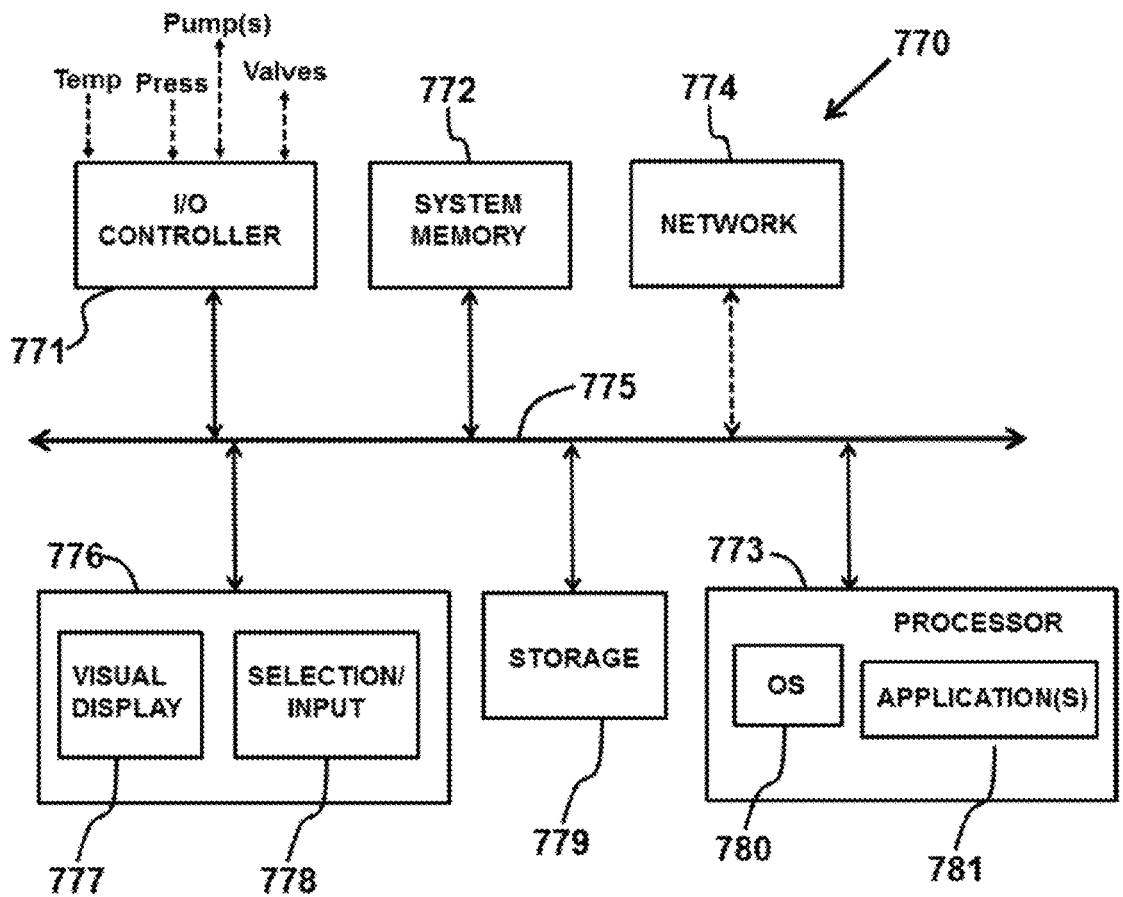
FIG. 7 schematically illustrates one computer used in the methods and devices described herein.

FIG. 7 provides a simplified illustration of a computing system for use in the devices and methods described herein. As illustrated in FIG. 6, in certain embodiments, the computing components can be integrated into a standard computer architecture or computer system 770. As illustrated in the figure, the hardware can include one or more processor(s) (CPU(s)) 773, a memory 772, a persistent storage 779 (e.g., hard drive, optical storage, flash storage, etc.), and hardware for a graphical user interface (GUI) 776, coupled by a local bus or interface 775. Computer components 770 can further include additional hardware components (not shown).

In various embodiments, system 770 can comprise, for example, a personal computer or workstation. Processor 773 can be, for example, a microprocessor, such as the XEON®, INTEL CORE 2®, PENTIUM DUAL CORE®, CELERON®, INTEL ATOM®, INTEL PENTIUM®, CORE I3®, CORE I5®, or CORE I7® microprocessors, made by Intel Corp. (Santa Clara, Calif.). Memory 772 can include, for example, random-access memory (RAM), read-only memory (ROM), virtual memory, or any other working storage medium or media accessible by processor 773. Persistent storage 779 can include a hard disk, a floppy disk, an optical or magneto-optical disk, a flash memory/solid state drive, or any other persistent storage medium. User interface (e.g., GUI) 776 facilitates communications between a user and system 770. In an illustrative embodiment, its hardware can include a visual display 777 and one or more selector/input device(s) (mouse, keyboard, etc.) 778. Through visual display 777, the system 770 can deliver graphical, textual, and numeric output to the user. From selector device 778, system 7790 can receive inputs indicating the user's selection of particular windows, menus, and menu items. Visual display 777 can include, for example, a cathode-ray tube (CRT) or flat-panel display screen, or a head-mounted display such as a virtual reality display. Selector device 778 can be, for example, a two-dimensional pointing device such as a mouse, a trackball, a track pad, a stylus, a joystick, or the like. Alternatively or additionally, selector device 778 can include a keyboard, such as an alphanumeric keyboard with function and cursor-control keys.

The software of system 770 can include an operating system 780 and an application program 781. The software of system 770 can further include additional application programs (not shown). Operating system 780 can be, for example, the MICROSOFT(R) WIN 7 OS, the ANDROID® OS, linux or a linux variant, Apple IOS®, a JAVA system, and the like. Alternatively, the operating system can be specialized for the operation of a latent heat thermal storage system as described herein. Application program(s) 781 is any application compatible with the operating system and system 770 architecture. Persons of skill in the art will appreciate that a wide range of hardware and software configurations can support the system and methods of the present invention in various specific embodiments.

The system 770 can be operably linked to pressure sensors and/or to temperature sensors and/or to flow rate meters, and/or to fluid level meters, and/or to valve controllers via an I/O controller 771. The pressure sensors, temperature sensors, can provide system 770 information about the pressure in the chamber, while the temperature sensor, if present, can provide information about the surface temperature of the thermal storage medium. The controller can provided devices to regulate the pressure in the chamber. In certain embodiments the pressure and/or temperature sensors can be integrated into the controller system to provide an integrated controller subsystem. The controller, sensors and/or integrated controllers subsystem need not be directly linked to the computer components 770, but rather may be operated remotely through a wired or wireless connection or through the internet or local area network.

The control methods described herein can be described in the general context of computer-executable instructions, such as program modules, being executed by a computer, computing component, etc. In general, program modules may include routines, programs, objects, components, data structures, etc. that perform particular tasks or implement particular abstract data types. In certain embodiments the control methods described herein can also be practiced in distributed computing environments where tasks are performed by remote processing devices that are linked through a communications network. In a distributed computing environment, program modules may be located in both local and remote computer storage media including memory storage devices.

Computing component/environment 770 may also include one or more type of computer readable media. Computer readable media can be any available media that is resident, on, associable with, or can be accessed by computing component/environment 770. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing components. Communication media may comprise computer readable instructions, data structures, program modules 'or other data embodying the functionality herein. Further, communication media may include wired media such as a wired network or direct-wired connection, and wireless media such as acoustic, RF, infrared and other wireless media. Combinations of the any of the above are also included within the scope of computer readable media.

In various embodiments computer readable media containing instructions to cause a computer system to operate a latent heat thermal storage system as described herein in accordance with any of the methods and/or operating configurations described herein are contemplated.

In the present description, the terms component, module, device, etc. may refer to any type of logical or functional process or blocks that may be implemented in a variety of ways. For example, the functions of various blocks can be combined with one another into any other number of modules. Each module can be implemented as a software program stored on a tangible memory (e.g., random access memory, read only memory, CD-ROM memory, hard disk drive) to be read by a central processing unit to implement the functions of the innovations herein. In various embodiments the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

Figure 8:
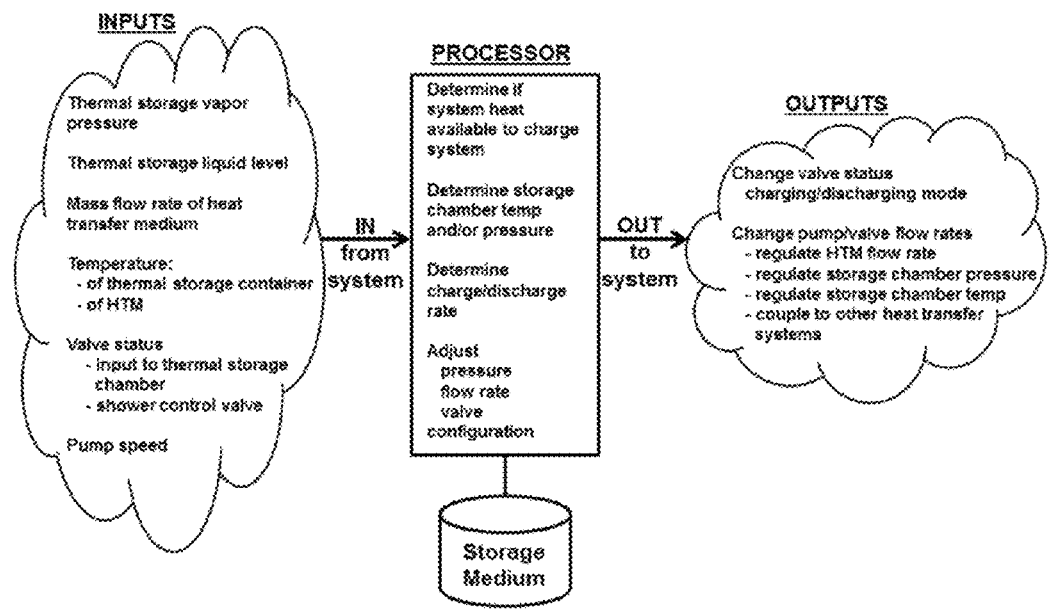
FIG. 8 is a schematic diagram showing the relationship between the processor/controller, and the various inputs received, functions performed, and outputs produced by the processor controller. As indicated, the processor may control various operational properties of the apparatus, based upon one or more inputs.

FIG. 8 is a schematic diagram illustrating one the relationship between the processor/controller, and the various inputs received, functions performed, and outputs produced by the processor controller in one illustrative embodiment. As indicated, the processor may control various operational properties of the apparatus, based upon one or more inputs.

An example of such an operational parameter that may be controlled is the timing of opening and closing of a valve allowing the entry of the heat exchange fluid into the heat storage chamber. As indicated above, regulation of the pressure in the heat storage chamber can alter the rate thermal charge/discharge of the heat storage system.

As disclosed herein, various implementations and features of the invention may be implemented through computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe components such as software, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some illustrative, but non-limiting, other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

It is understood that the examples and embodiments described herein are for illustrative purposes only and that various modifications or changes in light thereof will be suggested to persons skilled in the art and are to be included within the spirit and purview of this application and scope of the appended claims. Using the teachings provided herein numerous other configurations of thermal storage, heat exchange and heat transfer systems will be available to one of skill in the art. All publications, patents, and patent applications cited herein are hereby incorporated by reference in their entirety for all purposes.

What is claimed is:

1. A phase change material heat storage system comprising:
  a thermal storage chamber containing a phase change thermal storage material;
  a heat input device that carries a heat transfer fluid from a heat source, wherein said heat input device is configured to inject a vapor form of the heat transfer fluid into said thermal storage chamber; and
  a heat output device that carries a working medium from said thermal storage chamber to the device or system that is to be operated by the working medium, and that provides one or more heat exchange surfaces to transfer heat from said thermal storage chamber into said working medium;

wherein the heat transfer fluid is a liquid-gas phase change material with a phase transition temperature close to and above-the phase transition temperature of said thermal storage material and/or said working fluid;

wherein heat provided by said heat source is sufficient to change said working fluid from a liquid to a vapor, said system is configured to utilize the vapor phase of said heat transfer fluid as a working fluid and directed to said device or system, or said system is configured to utilize the vapor phase of said heat transfer fluid to transfer heat in a heat exchanger to a working fluid that is directed to said device or system; and the heat transfer fluid condensation mass flow ($q_{HTF}$) is determined using a liquid level meter and/or a mass flow meter, wherein said $q_{HTF}$ is adjusted to control the thermal charging rate.

2. A phase change material heat storage system comprising:

a thermal storage chamber containing a phase change thermal storage material;

a heat input device that carries a heat transfer fluid from a heat source, wherein said heat input device is configured to inject a vapor form of the heat transfer fluid into said thermal storage chamber; and a heat output device that carries a working medium from said thermal storage chamber to the device or system that is to be operated by the working medium, and that provides one or more heat exchange surfaces to transfer heat from said thermal storage chamber into said working medium;

wherein the heat transfer fluid is a liquid-gas phase change material with a phase transition temperature close to and above-the phase transition temperature of said thermal storage material and/or said working fluid;

wherein heat provided by said heat source is sufficient to change said working fluid from a liquid to a vapor, said system is configured to utilize the vapor phase of said heat transfer fluid as a working fluid and directed to said device or system, or said system is configured to utilize the vapor phase of said heat transfer fluid to transfer heat in a heat exchanger to a working fluid that is directed to said device or system; and the thermal charging rate is measured and/or controlled by measuring and/or controlling the vapor pressure in the thermal storage chamber and/or by measuring and/or controlling the surface temperature of the thermal storage material.

3. A phase change material heat storage system comprising:

a thermal storage chamber containing a phase change thermal storage material;

a heat input device that carries a heat transfer fluid from a heat source, wherein said heat input device is configured to inject a vapor form of the heat transfer fluid into said thermal storage chamber; and a heat output device that carries a working medium from said thermal storage chamber to the device or system that is to be operated by the working medium, and that provides one or more heat exchange surfaces to transfer heat from said thermal storage chamber into said working medium;

wherein the heat transfer fluid is a liquid-gas phase change material with a phase transition temperature close to and above-the phase transition temperature of said thermal storage material and/or said working fluid;

wherein heat provided by said heat source is sufficient to change said working fluid from a liquid to a vapor, said system is configured to utilize the vapor phase of said heat transfer fluid as a working fluid and directed to said device or system, or said system is configured to utilize the vapor phase of said heat transfer fluid to transfer heat in a heat exchanger to a working fluid that is directed to said device or system; and the thermal charging rate is under computer control whereby said system is operably linked to or incorporates a computer that receives one or more parameters selected from the group consisting of heat provided from thermal source, flow rate of heat transfer fluid from thermal source, temperature of heat transfer fluid from thermal source, vapor pressure in thermal storage chamber, surface temperature of one or more canisters in the thermal storage chamber, surface temperature of a canister in the thermal storage chamber, vapor temperature of heat transfer fluid in thermal storage chamber, flow rate of heat transfer material leaving thermal storage chamber, temperature of heat transfer material leaving thermal storage chamber, and degree of opening or status of one or more valves regulating flow of heat transfer material.

4. A phase change material heat storage system comprising:

a thermal storage chamber containing a phase change thermal storage material;

a heat input device that carries a heat transfer fluid from a heat source, wherein said heat input device is configured to inject a vapor form of the heat transfer fluid into said thermal storage chamber; and a heat output device that carries a working medium from said thermal storage chamber to the device or system that is to be operated by the working medium, and that provides one or more heat exchange surfaces to transfer heat from said thermal storage chamber into said working medium;

wherein the heat transfer fluid is a liquid-gas phase change material with a phase transition temperature close to and above-the phase transition temperature of said thermal storage material and/or said working fluid;

wherein heat provided by said heat source is sufficient to change said working fluid from a liquid to a vapor, said system is configured to utilize the vapor phase of said heat transfer fluid as a working fluid and directed to said device or system, or said system is configured to utilize the vapor phase of said heat transfer fluid to transfer heat in a heat exchanger to a working fluid that is directed to said device or system; and the thermal charging rate is under control of a computer and said computer controls and varies one or more operating configurations or parameters selected from the group consisting of valve configuration from a charging to discharging mode or from a discharging to a charging mode, heat transfer fluid flow rate into thermal storage chamber, heat transfer material flow rate out of thermal storage chamber, flow rate through showers in thermal storage chamber, coupling to external heat transfer systems, and coupling to power generation systems.

5. The heat storage system according to any one of claims 1, 2, 3, and 4, wherein said phase change thermal storage material is a liquid-solid thermal storage material.

6. The heat storage system according to any one of claims 1, 2, 3, and 4, wherein said phase change thermal storage material is contained within one or more phase change material canisters located in said thermal storage chamber.

7. The heat storage system according to any one of claims 1, 2, 3, and 4, wherein said phase change thermal storage material comprises a material selected from the group consisting of a paraffin, a fatty acid, a polyethylene glycol, and a salt.

8. The heat storage system of claim 7, wherein said phase change thermal storage material comprises a salt or a salt solution.

9. The heat storage system according to any one of claims 1, 2, 3, and 4, wherein said heat transfer fluid acts as the working medium in said heat output device.

10. The heat storage system according to any one of claims 1, 2, 3, and 4, wherein said heat output device comprises a heat exchanger that transfers heat from said heat transfer fluid to said working medium.

11. The heat storage system according to any one of claims 1, 2, 3, and 4, wherein said heat transfer fluid comprises a material selected from the group consisting of an oil, and an organic solvent.

12. The heat storage system of claim 11, wherein said heat transfer fluid comprises a material-selected from the group consisting of chloroform, methanol, acetyl chloride, cyclopentane, propionaldehyde, n-propyl amine, 2,3-dimethyl-1-butene, o-ethylphenol, ethyl benzoate, 1,2,3,4-tetrahydronaphthalene, n-hexylcyclopentane, 1-dodecene, VP-1 heat transfer oil, n-octadecane, n-pentadecylcyclopentane, and 1-eicosanol.

13. The heat storage system of claim 11, wherein said heat transfer fluid comprises an oil.

14. The heat storage system according to any one of claims 1, 2, 3, and 4, wherein said working fluid comprises water or an ammonia solution.

15. The heat storage system according to any one of claims 1, 2, 3, and 4, wherein said thermal storage material comprises $NaNO_3$.

16. The heat storage system according to any one of claims 1, 2, 3, and 4, wherein said heat output device is configured to carry said heat transfer fluid as a working medium to the device or system that is to be operated by the working medium.

17. The heat storage system according to any one of claims 1, 2, 3, and 4, wherein said heat output device is configured to carry said heat transfer fluid to a heat exchanger to transfer heat to said working medium which is delivered to the device or system that is to be operated by the working medium.

18. The heat storage system according to any one of claims 1, 2, 3, and 4, wherein said heat source comprises one or more solar thermal heat sources.

19. The heat storage system according to any one of claims 1, 2, 3, and 4, wherein the heat produced by said heat source is less than the heat carried by the vapor of said heat transfer fluid resulting in a heat transfer fluid output from said heat source that is a mixture of liquid and vapor.

20. The heat storage system according to any one of claims 1, 2, 3, and 4, wherein said device or system comprises a turbine.

21. The heat storage system according to any one of claims 1, 2, 3, and 4, wherein said system is configured to also direct the heat transfer fluid into said thermal storage chamber wherein said heat transfer fluid undergoes a vapor to liquid phase change and transfers heat to said thermal storage material that undergoes a solid to liquid phase change thereby charging said thermal storage material.

22. The heat storage system according to any one of claims 1, 2, 3, and 4, wherein said device is configured to regulate charging power by adjusting a valve that controls the admittance of a vapor form of the heat transfer fluid into the thermal storage chamber.

23. The heat storage system according to any one of claims 1, 2, 3, and 4, wherein when heat provided by said heat source is not sufficient to change said working fluid from a liquid to a vapor, and said thermal storage system is configured so that the heat transfer fluid from the heat source is valved off from the heat output device, and heat transfer fluid is contacted with the thermal storage material thereby transferring heat from the thermal storage material to said heat transfer fluid to effect a liquid to vapor phase transition of said heat transfer fluid the vapor phase of which is directed to said device or system or directed to a heat exchanger to heat a working fluid that is directed to said device or system.

24. The heat storage system of claim 23, wherein discharging power is maintained by adjusting the mass flow of the heat exchange medium.

25. The heat storage system of claim 23, wherein discharging power is maintained by measuring the surface temperature of the thermal storage material container, and/or the vapor pressure of the chamber.

26. A method of coupling a thermal source to a system or device to be driven by said thermal source, said method comprising:
coupling heat from said thermal source into a heat storage system according to any one of claims 1, 2, 3, and 4; and
retrieving heat from said heat storage system to said system or device whereby said heat drives said device.

27. The method of claim 26, wherein when heat provided by said heat source is sufficient to change said working fluid from a liquid to a vapor, the vapor phase of said heat transfer fluid is utilized as a working fluid and directed to said device or system or the vapor phase of said heat transfer fluid is directed to a heat exchanger to heat a working fluid that is directed to said device or system.

28. The method of claim 26, wherein when heat provided by said heat source is sufficient to change said working fluid from a liquid to a vapor the heated heat transfer fluid is directed into said thermal storage chamber wherein said heat transfer fluid undergoes a vapor to liquid phase change and transfers heat to said thermal storage material that undergoes a solid to liquid phase change thereby charging said thermal storage material.

29. The method of claim 26, wherein when heat provided by said heat source is not sufficient to change said working fluid from a liquid to a vapor, the heat transfer fluid from the heat source is valved off from the heat output device, and heat transfer fluid is contacted with the thermal storage material thereby transferring heat from the thermal storage material to said heat transfer fluid thereby discharging said thermal storage material to effect a liquid to vapor phase transition of said heat transfer fluid the vapor phase of which is directed to said device or system or directed to a heat exchanger to heat a working fluid that is directed to said device or system.

30. A method of using a material phase transition from liquid to vapor for heat transfer, heat exchange, and heat conversion to work and using a material phase transition from solid to liquid for heat storage liquid to solid heat storage discharge, said method comprising:
coupling heat from a thermal source into a heat storage system according to any one of claims 1, 2, 3, and 4; and
retrieving heat from said heat storage system to said system or device to drive said device or system;
wherein heat is transferred into said heat transfer fluid by a liquid to vapor phase transition of said heat transfer fluid, and heat is transferred out of said heat transfer fluid by a vapor to liquid phase transition of said heat transfer fluid; and wherein heat is transferred into said thermal storage material by a solid to liquid phase transition of said thermal storage medium and heat is transferred out of said thermal storage material by a liquid to solid phase transition of said thermal storage medium.

* * * * *